United States Patent
Cai

(10) Patent No.: US 9,505,559 B1
(45) Date of Patent: Nov. 29, 2016

(54) DEDICATED NETWORK DELIVERY SYSTEMS

(71) Applicant: Amazon Technologies, Inc., Reno, NV (US)

(72) Inventor: Xiaoshan Cai, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 187 days.

(21) Appl. No.: 14/274,930

(22) Filed: May 12, 2014

(51) Int. Cl.
*G06F 7/00* (2006.01)
*B65G 43/00* (2006.01)

(52) U.S. Cl.
CPC ..................................... *B65G 43/00* (2013.01)

(58) Field of Classification Search
None
See application file for complete search history.

(56) References Cited

U.S. PATENT DOCUMENTS 5,720,363 A * 2/1998 Kipp ...................... B61B 13/10
186/55
2001/0026549 A1* 10/2001 Hameleers et al. . G06Q 10/047
370/389

OTHER PUBLICATIONS

"Chicago Tunnel Company," http://en.wikipedia.org/wiki/Chicago_Tunnel_Company (last viewed May 12, 2014).

\* cited by examiner

*Primary Examiner* — Yolanda Cumbess
(74) *Attorney, Agent, or Firm* — Athorus, PLLC

(57) ABSTRACT

A dedicated network delivery system may avoid congestion experienced by traditional transportation networks and enable the delivery of objects from an origin to a destination using one or subterranean or aboveground elements. The network delivery system may be specifically configured to transport a particular type of object, such as an item, or a parcel or container having one or more items therein, in both vertical and horizontal directions along one or more of such elements, and in one or more item carriers such as carts, bags or boxes. The elements may be driven by or along one or more conveyors or rails, and may comprise one or more pressure-controlled carriers within a vacuum environment or among any type of fluid, including liquids or gases. A path between the origin and destination may be defined based on any factor, including travel time or cost, and any actual or predicted congestion.

16 Claims, 15 Drawing Sheets

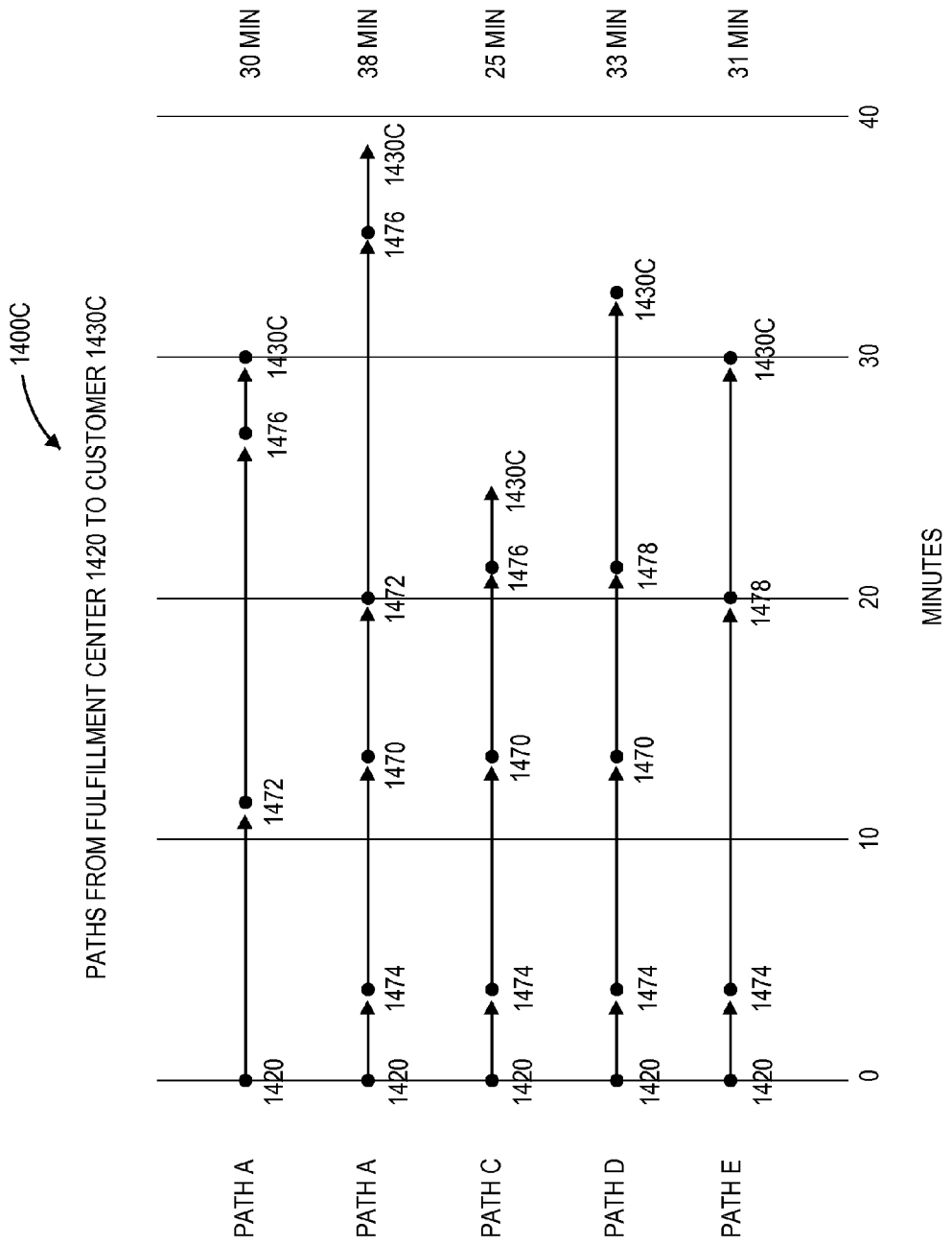

DEDICATED NETWORK DELIVERY SYSTEMS

BACKGROUND

Today, various numbers and types of open, diverse transportation networks allow for travel between origins and destinations on one or more roadways or railroads, or air or sea routes, in a nearly limitless number of vehicles. Such networks are versatile enough to permit passengers or cargo to travel independently or together in one or more carriers, and are not typically limited to any particular function or format. For example, at any given time, an interstate highway may accommodate cars carrying one or more people, buses carrying several passengers and their belongings, delivery trucks hauling a variety of packages or parcels, police cars or fire trucks operated by one or more public authorities, and any other type of vehicle to travel thereon, at various speeds. Similarly, a rail network allows both passenger trains and freight trains to travel on a point-to-point basis on the same sets of rails. Ferries, cruise ships, container ships and tankers coexist on open bodies of water such as rivers, bays or oceans, and passenger planes, cargo aircraft (both manned and unmanned), fighter jets and helicopters frequently traverse the skies.

Each of these open transportation networks may be subjected to delays of various forms, types or causes, which may ultimately hinder or halt the passage of some or all travel thereon. For example, a traffic jam on a secondary road will slow or stop not only passenger cars but also school buses, delivery vans or ambulances intending to pass thereby. Similarly, a train derailment or maintenance issue on a critical track between two hubs or stations of a rail network will cause any trains traveling thereon to be similarly backed up, regardless of whether such trains carry passengers or cargo. Stormy seas or a lack of available slips or moorings may prevent sailboats, fishing boats and cargo ships from pulling into a port, just as hurricanes or tornadoes may ground any type of aircraft.

Moreover, in order to travel from an origin to a destination, a passenger or an object such as a container having one or more items therein must typically travel within multiple transportation networks and along multiple modes of transit. For example, a passenger intending to fly from one city to another may be required to walk to a taxicab, ride in the taxicab to a train station, take a train to an airport before flying to another airport, where he or she must complete a similar process in reverse prior to reaching the other city. Similarly, a parcel delivered from a warehouse or like facility is occasionally delivered by hand to a car or a truck, then to an airport, a seaport or a train station via the van or truck, and to a corresponding airport, seaport or train station, from which the item is typically delivered to a customer by another car or truck. While passengers or cargo are in transit within any of these open transportation networks or traveling by any manner, such passengers or cargo may potentially restrict or otherwise cause a delay to any other passengers or cargo traveling within such networks or by any such manner, regardless of whether such passengers or such cargo are traveling to a common destination or according to a common purpose or function.

BRIEF DESCRIPTION OF THE DRAWINGS

FIGS. 14B and 14C are schematic diagrams depicting illustrative optimal delivery paths determined within the dedicated network delivery system shown in FIG. 14A.

DETAILED DESCRIPTION

As is set forth in greater detail below, the present disclosure is directed to providing a dedicated, automated network delivery system, and/or delivering an object by way of a dedicated, automated network delivery system. Such systems may be provided for the delivery of physical objects for a single purpose, or for multiple purposes, and may operate independently and discretely from traditional delivery systems, in whole or in part. In accordance with the present disclosure, a dedicated network delivery system may include both subterranean and aboveground components, including powered mover systems, such conveyors, or powered carriers (e.g., rail cars), operating on stationary network components (e.g., rails), as well as diversion systems of various types for transferring physical objects between one or more powered mover systems or powered carriers. Such components may cause the distribution of one or more objects from a central source to one of a number of distributed destinations, or between any number of nodes of a distributed system.

Additionally, the dedicated network delivery system may further include one or more control systems for automatically controlling the individual or collective operation of various powered mover systems, powered carriers or diversion systems, and thereby controlling the distribution of objects throughout the dedicated network delivery system. Such control systems may also plan one or more paths or routes for the distribution of the objects within the system, and avoid or handle any number of issues regarding system congestion that may arise in any manner.

Figure 1:
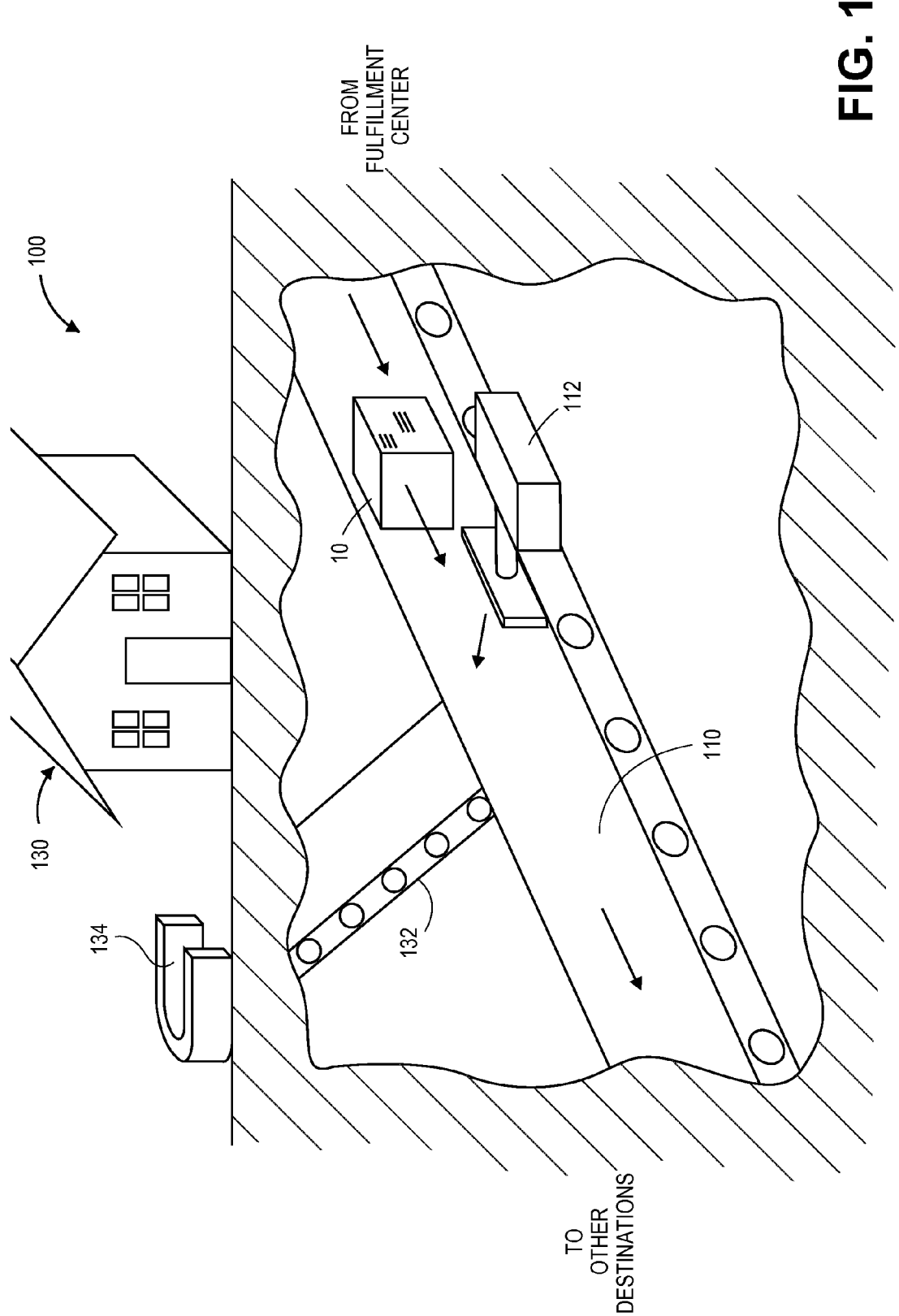
FIG. 1 is a pictorial diagram illustrating a delivery of an item from a fulfillment center to a node associated with a customer by way of a dedicated network delivery system in accordance with the present disclosure.

The systems and methods of the present disclosure thus enable the delivery of items, e.g., goods of any kind or sort, in a powered and controlled manner between a source and a destination at a variety of speeds without any interaction, or with minimal interaction, with traditional transportation networks, and with minimal to no human operators. Referring to FIG. 1, a pictorial diagram is shown illustrating a delivery of an item from a fulfillment center to a node associated with a customer by way of a dedicated network delivery system 100 in accordance with the present disclosure. In the illustrated embodiment, the system 100 includes a conveyor 110 for conveying an object 10, e.g., a container storing one or more items, from a fulfillment center to one or more destinations, such as a customer 130, beneath the surface of the earth and independent of any traditional transportation system. The conveyor 110 includes a diverter 112, e.g., a pusher diverter, for transferring the object 10 from the conveyor 110 to a conveyor extension 132, which will cause the object 10 to be transported to a conveyor terminus 134 associated with the customer 130.

Therefore, using a network delivery system of the present disclosure, such as the system 100 of FIG. 1, objects may be automatically distributed from one station or location to another within the system 100, while avoiding any delays, bottlenecks, hindrances or constraints ordinarily associated with traditional transportation systems. The components of the system 100, such as the conveyor 110, the diverter 112, the extension 132 and the terminus 134 may be automatically controlled by one or more computer control systems, which may transmit any number of instructions or commands for causing the object 10 to be delivered from a fulfillment system to a customer 130 along a predetermined path between and among such components without having to rely on automobiles to travel on one or more roads, trains to pass from station to station, ships to sail on the open seas or airplanes to fly from one terminal to another, or any other type or form of carrier with an onboard human operator.

Today's transportation networks include a variety of multimodal transportation systems, including various land, sea and air transit systems. Throughout American history, many such systems were implemented in phases over time. For example, in the first half of the nineteenth century, several thousand miles of canals such as the Erie Canal, which connected New York City and the Atlantic Ocean to Chicago and the Midwest by way of the Hudson River and the Great Lakes, were dug between various bodies of water, thereby expanding the capacity of water-based vessels to deliver goods and services to more inland destinations and between seaports. The second half of the nineteenth century was dominated by the growth of railroads and rail travel, as rail lines carrying locomotives and rail cars snaked across the continent in the wake of the Industrial Revolution, highlighted by the hammering of the Golden Spike at Promontory, Utah, which completed the first transcontinental railroad between the east and west coasts of the United States.

In the twentieth century, Henry Ford's assembly lines began operating in 1913, thereby enabling the low cost, mass production of cars and trucks for personal use. Automobiles continued to grow in popularity and efficiency with the advent of the Eisenhower Interstate Highway System in 1956, which permitted Americans to autonomously traverse the nation at elevated speeds on wide, structurally sound roadways and bridges. Finally, with the development of wide-body airliners such as the Boeing 747 in 1969, and the deregulation of airlines in the United States beginning in 1976, the delivery of passengers and cargo by air became increasingly efficient and cost-effective in the latter half of the twentieth century.

Despite the fundamental differences between these various modes of transport, however, each of the modes suffers from similar problems in terms of reliability and efficiency. For example, while automobiles such as cars or trucks are sufficiently versatile to drive on various types of roadways including expressways, streets or driveways, the speed by which a car or a truck may travel is limited by the capacity of such roadways, as well as any associated regulatory restrictions (e.g., speed limits) or traffic operating thereon. Similarly, while some trains in the United States may travel at maximum speeds of up to 165 miles per hour, such trains are rarely, if ever, able to reach such speeds due to the shared use of many rail lines among various types of passenger and freight trains, one or more geographic constraints (e.g., limited turn radii or elevation changes) or the obligation to stop at one or more stations. Like automobiles, ships are also versatile and may travel on waterways of varying widths or depths, including bodies of water as narrow as rivers or channels, and as vast as oceans or seas. However, ships may also be limited by adverse sea, air and weather conditions, and although two-thirds of the planet is covered by water, one-third is not so covered, thereby precluding ships from reaching many land-locked destinations. Air travel is largely unfettered, in that planes may travel quickly along a shortest route to an intended destination and may avoid traffic in three dimensions, but must begin and end their journeys on dedicated airfields, which may not conveniently be located near each and every origin or destination. While each such mode of transport may permit both passengers and cargo to travel thereon, transportation on all modes may be slowed or halted by incidents of varying degrees. To a certain extent, a transportation network that is clogged by one participant, e.g., a traffic accident on a roadway, a train derailment or delayed departures or arrivals at an airport plagued by severe weather, is frequently clogged to all participants.

The systems and methods of the present disclosure are directed to dedicated, automated network delivery systems for transporting objects from one station or location to another by way of any number of conveying systems or other mover systems. Such network delivery systems may be dedicated to a single purpose, e.g., the delivery of objects from a single source to one or more destinations, such as items delivered from a fulfillment center, a warehouse or a like facility to one or more customers. Alternatively, such network delivery systems may be directed to multiple purposes, such as the delivery of items from multiple vendors, manufacturers or merchants to a fulfillment center, and the delivery of items from the fulfillment center to multiple customers or other destinations. Additionally, the network delivery systems may include corresponding nodes or extensions associated with such fulfillment centers and customers, as well as connections with traditional transportation systems.

Some network delivery systems of the present disclosure may comprise one or more hubs, as well as any number of junctions or nodes associated with various locations or stations of the systems that are connected to each of the hubs, as well as interconnections between at least some of the hubs. Such nodes may be configured to permit travel in a single direction (e.g., to or from the node), or in multiple directions (e.g., both to and from the node), while a network delivery system of the present disclosure may include some nodes that are configured to permit travel in one direction and other nodes that are configured to permit travel in two or more directions. Some other systems of the present disclosure may comprise a single loop connecting a plurality of locations or stations to one another, while some other systems of the present disclosure may comprise two or more concentric loops connecting such locations or stations to one another. Moreover, the network delivery systems disclosed herein may comprise a single, homogenous form of mover system, such as a subterranean network of conveyor belts or rail cars traveling in a variety of directions and at a variety of elevations between any number of points or nodes, or a heterogeneous network of diverse, integrated mover systems, such as a network including conveyor belts and rail cars of any size or type operating both below and above ground.

The network delivery systems of the present disclosure may further include any number of computerized control systems for controlling the operation of the various mover systems and/or one or more diversion systems for transferring objects between such mover systems. Such control systems may be provided in a standalone location or facility dedicated to the operation of the various components of the network delivery system, or in conjunction with another location or facility, such as a fulfillment center or other location associated with the distribution of items ordered from an electronic marketplace. For example, upon identifying an origin of an object, and a destination for the object, a path for transporting the object along any number of segments of one or more mover systems may be defined, and the delivery of the object along the path by way of a network delivery system may be automatically controlled from a central location or computer-based processing system, or from one or more distributed computer-based processing systems, where desired.

Where one or more of the dedicated network delivery systems of the present disclosure include multiple available paths through a variety of points or nodes between a source and a destination, e.g., between a fulfillment center and a customer, the systems and methods of the present disclosure may determine an optimal path for transporting an object from the source to the destination according to one or more algorithms, formulas or processes. The optimal path may be defined based on a shortest time or lowest cost required to transport an object from the source to the destination, or on any other factor or combination of factors, and may consider specific two-dimensional or three-dimensional locations of the various points or nodes within a dedicated network delivery system, as well as the architecture or capacities of the components or elements of the system. Information regarding an optimal path may be stored in at least one data store, and provided in the form of one or more commands or instructions to a carrier for transporting the object along the optimal path from the source to the destination.

In accordance with the present disclosure, an optimal path, or a "shortest path," may be defined by one or more known algorithms, formulas or processes, including those previously associated with transportation between points, vertices or nodes. For example, the systems and methods of the present disclosure may define such optimal paths using one or more iterations of common mathematical principles for solving shortest path problems, including but not limited to Dijkstra's Algorithm, the Bellman-Ford Algorithm, the Floyd-Warshall Algorithm, Johnson's Algorithm or hub labeling.

Such algorithms, formulas or processes may also use any amount of geospatial information regarding locations of points or nodes within a distributed network delivery system, or information regarding congestion or capacity at junctions associated with such points or nodes, when identifying an optimal path for traveling between two or more of the points or nodes. For example, information regarding the locations of points or nodes may be expressed in a two-dimensional Cartesian format, or $(x_i, y_i)$ for each point or node i, having a latitude $x_i$ and longitude $y_i$; or in a three-dimensional format, or $(x_i, y_i, z_i)$ for each point or node i, referencing not only the latitude $x_i$ and the longitude $y_i$ of the point or node, but also an elevation or depth $z_i$ (e.g., a subterranean or aboveground position) within the network delivery system. Such location information may be maintained or stored in one or more computer systems and, upon receiving a request to deliver an object from one point or node to another point or node within the network delivery system, identified and accessed in connection with the request.

Additionally, where an optimal path is to be determined based on congestion at one or more points or nodes, the optimal path may be defined based on actually observed congestion at junctions associated with such points or nodes (e.g., actual carrier flow through such points or nodes) or predicted congestion at such points or nodes (e.g., estimates of carrier flow based on received orders or outstanding instructions to deliver that have been issued). Such actual or predicted congestion may be referenced in a qualitative manner (e.g., that a point or node is congested or is not congested at any given time) or in a quantitative manner (e.g., an extent to which the point or node is congested, as expressed in a percent or other numerical form). The optimal path may elect to avoid congested points or nodes, or points or nodes that are congested to a predetermined manner in accordance with the present disclosure.

The physical layout or configuration of a network delivery system may be represented as a network for the purpose of identifying an optimal path between two or more points or nodes. According to some embodiments, the network delivery system may be represented as a directed graph of varying degrees of completion. For example, a network delivery system of the present disclosure may be defined as a directed acyclic graph without any directed cycles, e.g., in which each of the edges of the graph is directed such that no path beginning at an origin and returning to the origin may be defined based on such edges. The various paths between two or more points or nodes may be identified and topologically sorted in order to determine which of such paths is optimal, e.g., the most efficient path for traveling between such points or nodes in terms of time or cost, or according to any other metric or standard. According to some other embodiments, the network delivery system may be represented as a complete directed graph, in which each of the points or nodes is connected to one another, thereby enabling a comprehensive analysis of all available interconnections between such points or nodes when identifying the optimal path. In still other embodiments, the network delivery system may be represented as a partially completed directed acyclic graph.

As is discussed above, the network delivery systems of the present disclosure may have any number of points or nodes, and algorithms, formulas or processes for determining paths or avoiding congestion may consider each of the points or nodes in the network when defining an optimal path for the transportation of an object. Alternatively, in an effort to conserve computer processing power or to enhance the efficiency of the process of identifying an optimal path, the systems and methods disclosed herein may group one or more of the points or nodes into clusters, and then define an optimal path according to a two-element process.

First, an optimal path between and among such clusters may be defined, and, second, an optimal path within a cluster associated with a destination may be defined. For example, where a network delivery system comprises one thousand (or $10^3$) points or nodes, determining an optimal path between any two of such points or nodes may require up to one million (or $10^6$, or $10^3$ squared) steps. Where the points or nodes of the network delivery system are grouped into one hundred (or $10^2$) clusters of ten nodes each, determining the optimal path between any two of such points or nodes may require up to ten thousand ($10^4$, or $10^2$ squared) steps to determine the optimal path between clusters corresponding to each of the two points or nodes, and up to one hundred ($10^2$, or 10 squared) steps to determine the optimal path within the destination node. Thus, the maximum theoretical number of steps required in order to define an optimal path may be reduced from 1,000,000 to 10,000, or by nearly a factor of ten.

Moreover, the transportation of objects within the network delivery systems of the present disclosure may be controlled from a control system provided at a central location, which may be associated with one or more of the hubs or nodes (e.g., a fulfillment center, a delivery destination, junction, etc.). Alternatively, the transportation of objects within such systems may be centrally controlled between groups or clusters of points or nodes, and locally controlled within such groups or clusters of points or nodes. For example, when an order for one or more items is received from a customer of an electronic marketplace and assigned to a particular a fulfillment center, the transportation of the ordered items from the fulfillment center to a destination specified by the customer may be controlled from a first (e.g., centrally located) control system as the ordered items are transported to a vicinity of the destination, where control of the transportation of the ordered items may be transferred to a second (e.g., local) control system within the vicinity of the destination until such items have reached the customer.

When planning the delivery of objects between and among nodes of a network delivery system, the systems and methods of the present disclosure may be configured to treat each object being transported as of equal importance, or in a homogenous manner, such that no one object is prioritized over any other. Alternatively, the systems and methods disclosed herein may rank each and every object, or various categories of objects, in a heterogeneous manner, in terms of their relative priority with respect to one another for the purpose of capacity planning or congestion avoidance. An item or object may be assigned a higher priority level or a lower priority level, with respect to other items or objects that are to be transported by one or more of the network delivery systems disclosed herein, based on any number of intrinsic or extrinsic factors regarding the item or object, a source or origin of the item or parcel, or a destination or recipient of the item or object. For example, items or objects having an inherent expiration or spoiling date (e.g., fresh meats or produce, or tickets to an athletic event that is slated to occur at a given date or time) may be placed ahead of, e.g., shipped sooner than, or prior to, items or objects lacking such an expiration or spoiling date in terms of priority. Similarly, items or objects for which a sender or recipient has paid an additional surcharge or fee may be placed ahead of items or objects for which neither the sender nor the recipient paid the additional surcharge or fee in terms of priority.

Because the network delivery systems disclosed herein may operate independently of other transportation networks, the various components of such systems may be installed in association with or in parallel with components of such networks, e.g., below or above existing roadways, rail lines or utility easements, or without regard to the locations or alignments of any existing transportation network facility components. Rather, the locations and alignments of the various components of the systems disclosed herein may be selected on any basis, such as cost, convenience to users, or efficiency.

Additionally, the network delivery systems disclosed herein may be constructed or assembled according to any standard form of construction. For example, any number of tunnels, channels, pipes or beds may be built to accommodate the mover systems, extensions and/or termini for the network delivery systems using any number of excavators, boring or tunneling tools and paving or pouring machines. Additionally, power may be provided to the mover systems or carriers of the present disclosure by any manner and in any form, including but not limited to alternating current (AC) electric power, direct current (DC) electric power, solar power, geothermal power, wind power, nuclear power, fuel cells or any form of petroleum-based power, e.g., gasoline, diesel fuel, natural gas and/or propane.

Notably, because the network delivery system disclosed herein may be provided for a specific purpose, e.g., delivering objects, and need not be associated with traditional transportation networks, such systems need not maintain an environment that is suitable for the survival and safety of humans or other animals, such as an environment that includes sufficient oxygen supplies and/or sanitation services, or is maintained at an acceptable temperature. Rather, the environmental conditions within the network delivery system (e.g., the environment surrounding the mover systems and/or carriers) of the present disclosure may be selected based on the particular needs or requirements of the network delivery systems in which such movers or carriers are provided. For example, where the network delivery system is intended to transport temperature-sensitive items such as chocolates or ice cream, or heated prepared foods, temperatures within the system may be preferably maintained within a defined band in order to prevent such items from melting or cooling. Where the network delivery system is intended to transport items that may be maintained at nearly any temperature, however, such as clothing or hardware, little to no control over the temperature associated with the system may be required other than to provide for a suitable operational environment for the various components of the system itself.

As is discussed above, the network delivery system of the present disclosure may use one or more mover systems to transport objects, items or materials of varying sizes and shapes, and typically include any number of machines or elements for causing the motion or translation of such objects, items or materials from one location or station to another. A mover system may include machines or elements that cause or enable such motion or translation. A mover system may be driven by any form of prime mover, including belts, chains, screws, rails, tracks or rollers, and the objects, items or materials may be transported in a container or carrier, or on or within the mover itself. A mover system may further include one or more pulleys, shafts, hubs, bushings, sprockets, bearings and other elements for causing a movement. Further, a mover system may convey objects, items or materials into one or more static or dynamic apparatuses, such as a bin, a chute, a cart, a truck or the like.

The mover systems disclosed herein may also incorporate one or more buffer spaces or sidings for accommodating carriers that accumulate in a vicinity of junctions associated with points or nodes. For example, where a carrier that includes a variety of containers departs from a source (e.g., a fulfillment center) and approaches a junction, and a path between the junction and an ultimate destination for the carrier is congested, the carrier may be diverted to a buffer space or a siding to permit carriers, that depart from the same source and that are intended to travel to other destinations, to pass through the junction. Once the path between the junction and the ultimate destination for the carrier has been cleared, the carrier may be restored to its route from the junction to the ultimate destination. Alternatively, such buffer spaces or sidings may enable lower priority traffic to be stored in a vicinity of a junction, and thereby allow higher priority traffic to pass through the junction.

Some embodiments of the present disclosure, such as the system 100 of FIG. 1, may utilize mover systems in the form of conveying systems, such as banded continuous-loop belts (e.g., rubber or fabric) that are placed into motion by a series of two or more pulleys, at least one of which is driven by a motor. Conveyor belts may operate at various speeds, ranging from a standard speed of approximately sixty-five feet per minute (65 fpm), or about 0.7 miles per hour (0.7 mph) to a peak speed of approximately three thousand feet per minute (3000 fpm), or about thirty-three miles per hour (33 mph). Objects, items or materials may be placed directly onto the belt, or into one or more bins or like containers that may be placed on the belt. Similarly, a chain conveyor may carry one or more pendants, which may be used to pull unit loads on pallets or other large-scale containers. Conveying systems may also include a gravity conveyor, which may consist of a series of rollers that may be used to move objects based on a difference in height, and a resulting difference in gravitational potential energy, without the use of a motor.

Additionally, a mover system may include one or more diverters or diversion systems in order change a direction of travel of one or more objects within a conveying system, or to cause such objects to travel in an intended direction toward a desired destination. For example, a diverter may be used to direct an object from one conveyor apparatus (e.g., an ingress conveyor belt) to another (e.g., an egress conveyor belt, or another egress apparatus such as a bin, a chute, a cart or a truck), or to remove or otherwise extricate an object from a conveying system entirely. Some common diverters include a pusher diverter, which may physically move one or more objects traveling on a conveyor into an adjacent apparatus or container, or onto another conveyor, as well as a steered wheel diverter, which may be installed in series with a conveyor, and may include one or more wheels to permit items to roll or pass thereon. The wheels of a steered wheel diverter may be pivoted to any orientation with respect to an axis or direction of travel of the conveyor, thereby causing objects traveling on the conveyor to move in a different direction upon striking the wheels of the steered wheel diverter. Any type of diverters or diversion systems may be utilized to transfer objects from one element or segment of a network delivery system to another element or segment in accordance with the present disclosure.

In addition to conveying systems, other mover systems may be provided in accordance with the present disclosure for the purpose of delivering objects on one or more network delivery systems. For example, systems comprising rack-and-pinion arrangements, e.g., with a linear gear known as a "rack," and a rotating, substantially circular gear known as a "pinion," may be used for the purpose of translating objects on flat or graded surfaces. Furthermore, systems utilizing moving or static rails of various types, and having carriers of various kinds, may be provided. For example, many trains in a traditional "light rail" system travel at approximately sixty-five miles per hour (65 mph), while standard high-speed trains may travel at speeds of one hundred fifty to two hundred fifty miles per hour (150 to 250 mph). Magnetic levitation (or "maglev") trains may also travel at speeds of approximately three hundred fifty miles per hour (350 mph). Additionally, hyperloop systems in which capsules travel within low-pressure tubes at elevated speeds of up to 700 miles per hour that may be maintained through the use of linear induction motors and air compressors may be used for delivering objects in one or more network delivery systems of the present disclosure.

The network delivery systems disclosed herein may also comprise a water-based network in which sealed carriers having one or more items therein may travel within pipes or conduits that are substantially filled with water. Such a water-based network may enable the transportation of containers at speeds determined by currents passing within the network. Those skilled in the pertinent arts will recognize that any such processes or methods for causing the transportation of objects may be incorporated into a dedicated network delivery system of the present disclosure, which may utilize one or more networks of mover systems, diversion systems or other components operating according to one or more such processes or methods.

Figure 2:
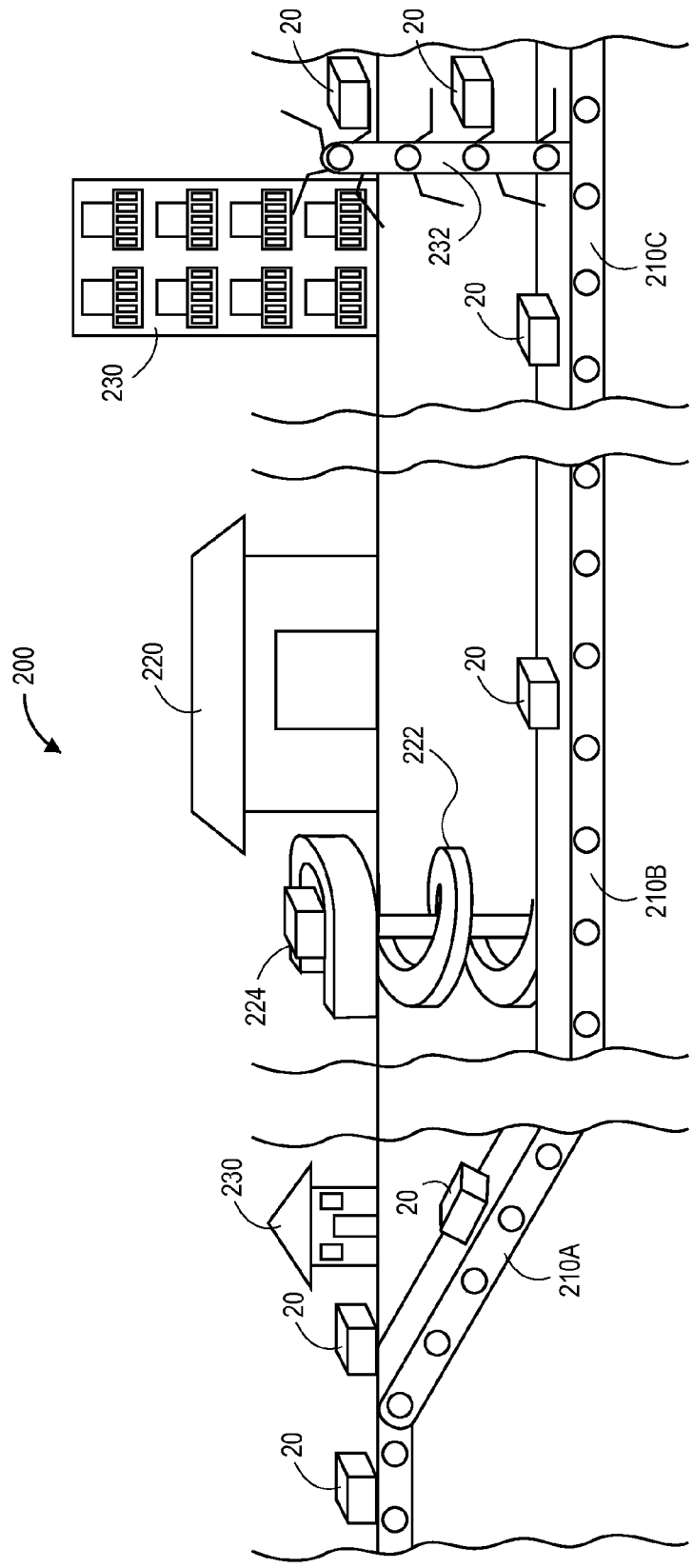
FIG. 2 is a pictorial diagram illustrating components for delivering an item from a fulfillment center to multiple nodes by way of a dedicated network delivery system in accordance with the present disclosure.

The systems and methods of the present disclosure may comprise networks arranged in any number or type of configurations between two or more locations or stations, e.g., between a fulfillment center and one or more customers, such as elements or segments aligned on any number of axes or having components at varying elevations, including subterranean components at any depths, and aboveground components at any heights. Moreover, the networks may further include extensions associated with such destinations that may extend from one or more conveying systems to a terminus or other point associated with such locations or stations, thereby enabling items to be passed from such conveying systems to the terminus. Referring to FIG. 2, a pictorial diagram illustrating components for delivering an item from a fulfillment center to multiple nodes by way of a dedicated network delivery system 200 in accordance with the present disclosure are shown. Except where otherwise noted, reference numerals preceded by the number "2" in FIG. 2 indicate components or features that are similar to components or features having reference numerals preceded by the number "1" shown in FIG. 1.

As is shown in FIG. 2, the system 200 includes branches 210A, 210B, 210C of a main conveyor, e.g., a belted conveying system, such as the conveyor 110 of the system 100 of FIG. 1, for transporting items 20 thereon. The branch 210B of the main conveyor includes a spiral elevator extension 222 and a terminus 224 associated with a fulfillment center 220. The portion of the branch 210B shown in FIG. 2 remains entirely underground at a constant depth. The branch 210A of the main conveyor is ramped upward from the depth of the branch 210B, to a depth of a surface of the ground in a vicinity of a customer 230, viz., a home. The branch 210C of the main conveyor also comprises a vertical elevator extension 232 and a terminus 234 associated with a plurality of customers 230, viz., an apartment building. The branch 210C remains entirely underground at the constant depth of the branch 210B. The vertical elevator extension 232 is configured to lift items 20 from the depth of the branch 210C to the customers 230.

Accordingly, as is shown in FIG. 2, the systems and methods of the present disclosure may comprise any number of transportation components for causing items to travel horizontally or vertically from one location to another, such as the various branches 210A, 210B, 210C of the main conveyor shown in FIG. 2, each of which may be automatically controlled from one or more computer-based control systems. Additionally, such systems and methods may further include components or extensions for transferring items between a main conveying system and a destination (e.g., a fulfillment center, a customer or another location). Such extensions may include paths of translation that are aligned vertically, or nearly vertically, such as the vertical elevator extension 232, as well as horizontally, or nearly horizontally; or in any direction or along any axis having a combination of horizontal and vertical components, such as the spiral elevator extension 222.

Moreover, the network delivery systems and methods disclosed herein may comprise hub-and-node configurations, e.g., with a hub at a central location and spokes extending therefrom to one or more nodes, or may define looped systems having one or more extensions associated with specific locations, e.g., the vertical elevator extension 232 or the spiral elevator extension 222 of FIG. 2, which enable objects to be transported from such looped systems to or from such locations without impeding the transportation of other objects by way of such looped systems. The extensions may thereby connect various external elements with the delivery systems and methods disclosed herein, including, for example, any storage facilities, as well as connections to components of any traditional delivery systems such as highways, train depots or airports.

Figure 3:
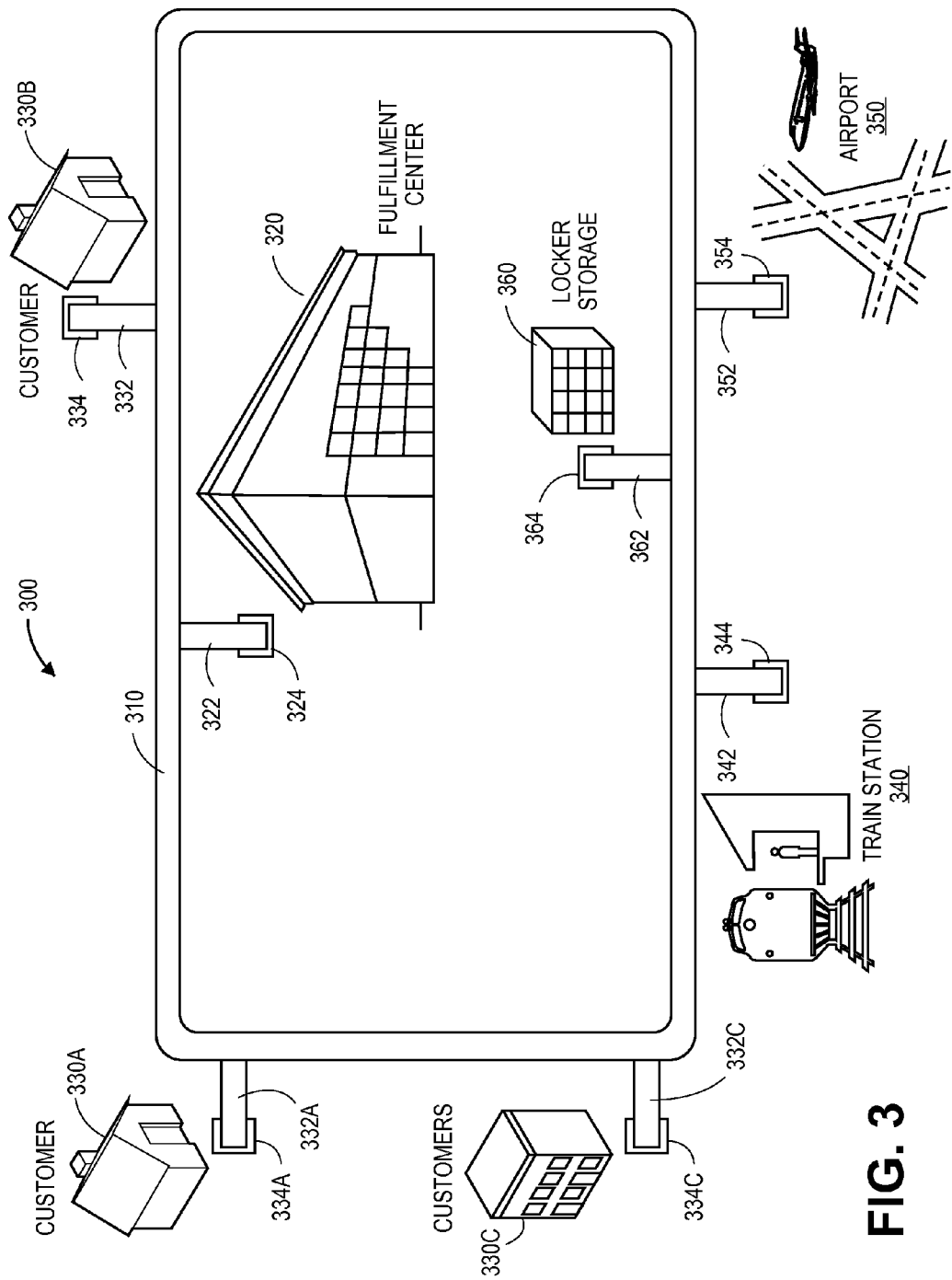
FIG. 3 is a pictorial diagram illustrating components for delivering items of items to multiple nodes by way of a dedicated network delivery system in accordance with the present disclosure.

Referring to FIG. 3, a pictorial diagram is shown illustrating components for delivering items to multiple nodes by way of a dedicated network delivery system 300 in accordance with the present disclosure. Except where otherwise noted, reference numerals preceded by the number "3" in FIG. 3 indicate components or features that are similar to components or features having reference numerals preceded by the number "1" or "2" in FIG. 1 or 2, respectively.

As is shown in FIG. 3, the looped main conveyor 310 further connects a plurality of locations 320, 330A, 330B, 330C, 340, 350, each comprising an extension 322, 332A, 332B, 332C, 342, 352 to the looped main conveyor 310 and a corresponding terminus 324, 334A, 334B, 334C, 344, 354. The locations 320, 330A, 330B, 330C, 340, 350 include a fulfillment center 320, customers 330A, 330B (viz., single-family dwellings), customer 330C (viz., an apartment building), a train station 340, an airport 354 and a locker storage facility 360, which may be provided as a central delivery point in a dense environment such as an urban center or college campus.

The looped main conveyor 310 may comprise any number of subterranean and/or aboveground conveying elements or segments extending between two or more locations. Additionally, the looped main conveyor 310 may comprise a single loop of elements or segments configured to operate in a common revolutionary direction (e.g., clockwise or counter-clockwise) or, alternatively, multiple loops of elements or segments that are aligned in a concentric manner and operating in opposite revolutionary directions (e.g., one clockwise loop and one counter-clockwise loop).

Moreover, the looped main conveyor 310 may be homogenous in nature, such that each of the elements or segments included therein comprises a similar mover system (e.g., each of the elements or segments is a belted conveyor) having similar dimensions, capacities or operating characteristics (e.g., each of the elements or segments has a common width, height or speed). Alternatively, the looped main conveyor 310 may be a heterogeneous system, including elements or segments that are different in form (e.g., elements or segments including both a belted conveyor and a static rail-based delivery system having powered rail cars operating thereon) or function (e.g., elements or segments having different dimensions, including larger dimensions and/or higher speeds in areas of high demand, or smaller dimensions and/or slower speeds in areas of low demand). Each of the elements of the looped main conveyor 310 may be controlled independently or collectively from a centrally located or localized control system (not shown) provided in a standalone location or facility dedicated to the operation of the various components of the network delivery system, or in conjunction with another location or facility.

Similarly, the extensions 322, 332A, 332B, 332C, 342, 352 to the looped main conveyor 310 and the corresponding termini 324, 334A, 334B, 334C, 344, 354 may include one or more computer-controllable features for causing items to be transferred into, and removed from, the main conveyor 310. For example, the extensions 322, 332A, 332B, 332C, 342, 352 may operate selectively in a single direction, e.g., inbound to the main conveyor 310 or outbound from the main conveyor 310, or may include two-way operating elements that permit items to be transferred to or from the main conveyor 310 in the inbound or outbound directions simultaneously. The termini 324, 334A, 334B, 334C, 344, 354 may further include any devices or systems for receiving items from, or loading items onto, the corresponding extensions 322, 332A, 332B, 332C, 342, 352.

Accordingly, using a network delivery system, such as the system 300 of FIG. 3, objects may be transported between and among each of the locations 320, 330A, 330B, 330C, 340, 350 in an automatic and controlled manner, independent of any external or traditional transportation network or system. For example, items ordered by one or more of the customers 330A, 330B, 330C from an electronic marketplace and assigned to the fulfillment center 320 may be automatically delivered to the customers 330A, 330B, 330C by way of the fulfillment center extension 322, the looped main conveyor 310 and one or more of the customer extensions 332A, 332B, 332C. One or more control systems associated with the main conveyor 310 or the fulfillment center 320 may transmit any number of instructions or commands to such components for causing the items to be transported thereon until such items arrive at the extensions 332A, 332B, 332C associated with the customers 330A, 330B, 330C. Upon the items' arrival, one or more diverters, diversion systems or other like manner may cause such items to be transferred from the main conveyor 310 to such extensions 332A, 332B, 332C, and ultimately to the termini 334A, 334B, 334C associated with such extensions 332A, 332B, 332C. Conversely, where one or more items is to be returned to the electronic marketplace for any reason, the customers 330A, 330B, 330C may place such items upon one of the extensions 332A, 332B, 332C and transferred to the main conveyor 310 thereby. The main conveyor 310 may be controlled in a manner that causes such items to be transferred to the fulfillment center extension 322 and, ultimately, to the fulfillment center 320.

Similarly, items may be transported from the fulfillment center 320 to the locker storage facility 360, where such items may be placed into one or more lockers or like areas (e.g., cubbies, receptacles, bins, shelves) by automatically controlling the operation of the fulfillment center extension 322, the main conveyor 310 and the locker storage facility extension 362 from one or more control centers. Items may also be returned from the locker storage facility 360 to the fulfillment center 320 in a reciprocal fashion.

Additionally, those skilled in the pertinent arts would also recognize that the system 300 of FIG. 3 may be configured to receive inbound shipments from vendors, manufacturers or merchants at the fulfillment center 320 by way of the train station 340, the airport 350 or any other traditional transportation network (not shown). For example, where a vendor who is not affiliated with the system 300 intends to make his or her items (e.g., goods, products, services or information of any type or form) available to customers of the marketplace by way of the fulfillment center 320, the vendor may cause one or more containers including the items to be delivered to the train station 340 or the airport 350, where such containers may be loaded onto the train station extension 342 or the airport extension 352, and ultimately to the main conveyor 310. Such extensions 342, 352 and the main conveyor 310 may be automatically controlled to cause the inbound shipment containers to be delivered to the fulfillment center 320. Conversely, the fulfillment center 320 may make outbound shipments of items to customers who are not affiliated with the system 300, by causing one or more containers or carriers including the items of an outbound shipment to be placed onto the fulfillment center extension 322, and ultimately to the main conveyor 310. The containers or carriers automatically may be transported to the train station extension 342 or the airport extension 352, where such containers or carriers may be loaded onto one or more trains or planes, respectively, and delivered to the customers who ordered the items of the outbound shipment.

Figure 4:
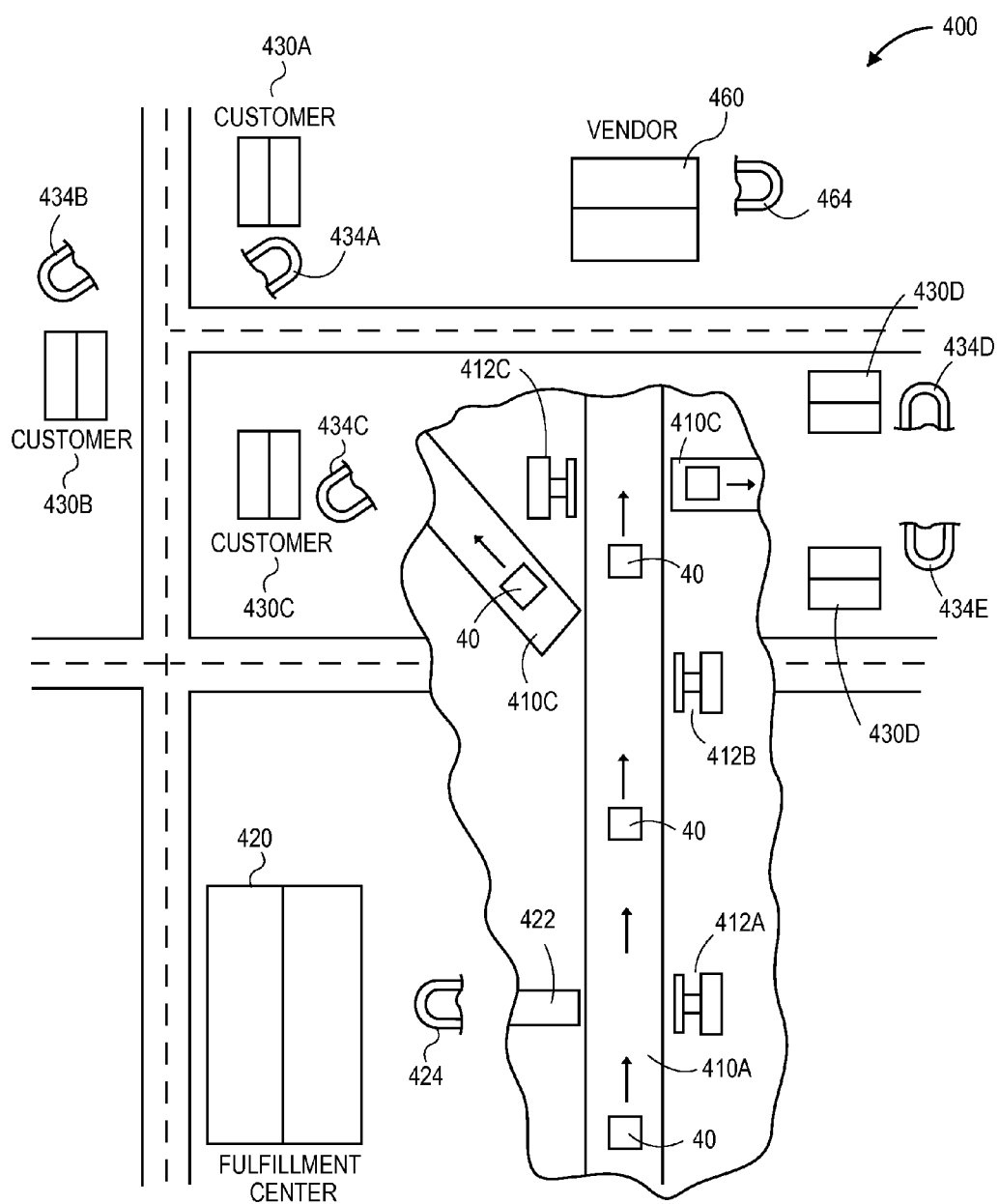
FIG. 4 is a pictorial diagram illustrating components for transporting items between nodes of a dedicated network delivery system in accordance with the present disclosure.

As is discussed above, the various aspects of the present disclosure may be provided in any manner between locations for which the transportation of objects is desired, including within or among existing easements or publicly owned properties that are already accommodating transportation networks or utilities, or in an independent manner defined by the demand for the delivery of items by way of such network delivery systems. Referring to FIG. 4, a pictorial diagram is shown illustrating components for transporting items between nodes of a dedicated network delivery system 400 for transporting items 40 in accordance with the present disclosure. Except where otherwise noted, reference numerals preceded by the number "4" in FIG. 4 indicate components or features that are similar to components or features having reference numerals preceded by the number "1," "2" or "3" in FIG. 1, 2 or 3, respectively.

The system 400 of FIG. 4 includes a main conveyor 410A, along with auxiliary conveyors 410B, 410C, extending in a subterranean manner beneath a city including a fulfillment center 420, as well as a plurality of customers 430A, 430B, 430C, 430D, 430E and a vendor 460 aligned on an existing aboveground street network. The system 400 further includes diverters or diversion systems 412A, 412B, 412C for transferring items 40 from the main conveyor 410A to other conveyors 410B, 410C or subterranean extensions 422, 432A, 432B, 432C, 432D, 432E, 462 associated with the fulfillment center 420, the customers 430A, 430B, 430C, 430D, 430E or the vendor 460.

For example, as is shown in FIG. 4, a diverter 412A is aligned to transfer items from the main conveyor 410A to a fulfillment center extension 422, while a diverter 412B is aligned to transfer items from the main conveyor 410A to the auxiliary conveyor 410B and a diverter 412C is aligned to transfer items from the main conveyor 410A to the auxiliary conveyor 410C. Furthermore, as is also shown in FIG. 4, the fulfillment center 420, the customers 430A, 430B, 430C, 430D, 430E or the vendor 460 each includes an aboveground terminus 424, 434A, 434B, 434C, 434D, 434E, 464. The termini 424, 434A, 434B, 434C, 434D, 434E, 464 shown in FIG. 4 are positioned in association with the alignments of the various extensions 422, 432A, 432B, 432C, 432D, 432E, 462.

Accordingly, the system 400 of FIG. 4 is a network delivery system that is aligned to transport a plurality of items 40 underground, along a plurality of conveyors 410A, 410B, 410C, such that items 40 may be transported substantially underground beginning shortly after entering the system 400, viz., upon departing the fulfillment center 420 by way of the fulfillment center extension 422, until arriving at their respective destinations, viz., at one or more of the customers 430A, 430B, 430C, 430D, 430E or the vendor 460, where the items 40 may ascend by way of the various extensions 422, 432A, 432B, 432C, 432D, 432E, 462 and arrive at their respective termini 424, 434A, 434B, 434C, 434D, 434E, 464.

Moreover, the alignment and locations of the various features of the network delivery systems of the present disclosure (e.g., the conveying systems, extensions and/or termini) may be selected on any basis and for any reason, such as cost, convenience, efficiency or the general or specific purposes for which such systems are intended. While the routes associated with the aboveground street network may have been selected according to the various land use of the neighboring parcels, or the environmental conditions in the area, the systems and methods are not so limited. Instead, decisions on the placement and configuration of network delivery system components may be made based on the long-term financial value of and demand for such systems, subject to the resolution of any matters concerning the availability or suitability of one or more aboveground or subterranean properties, and without regard to any traditional transportation network alignments.

Figure 5:
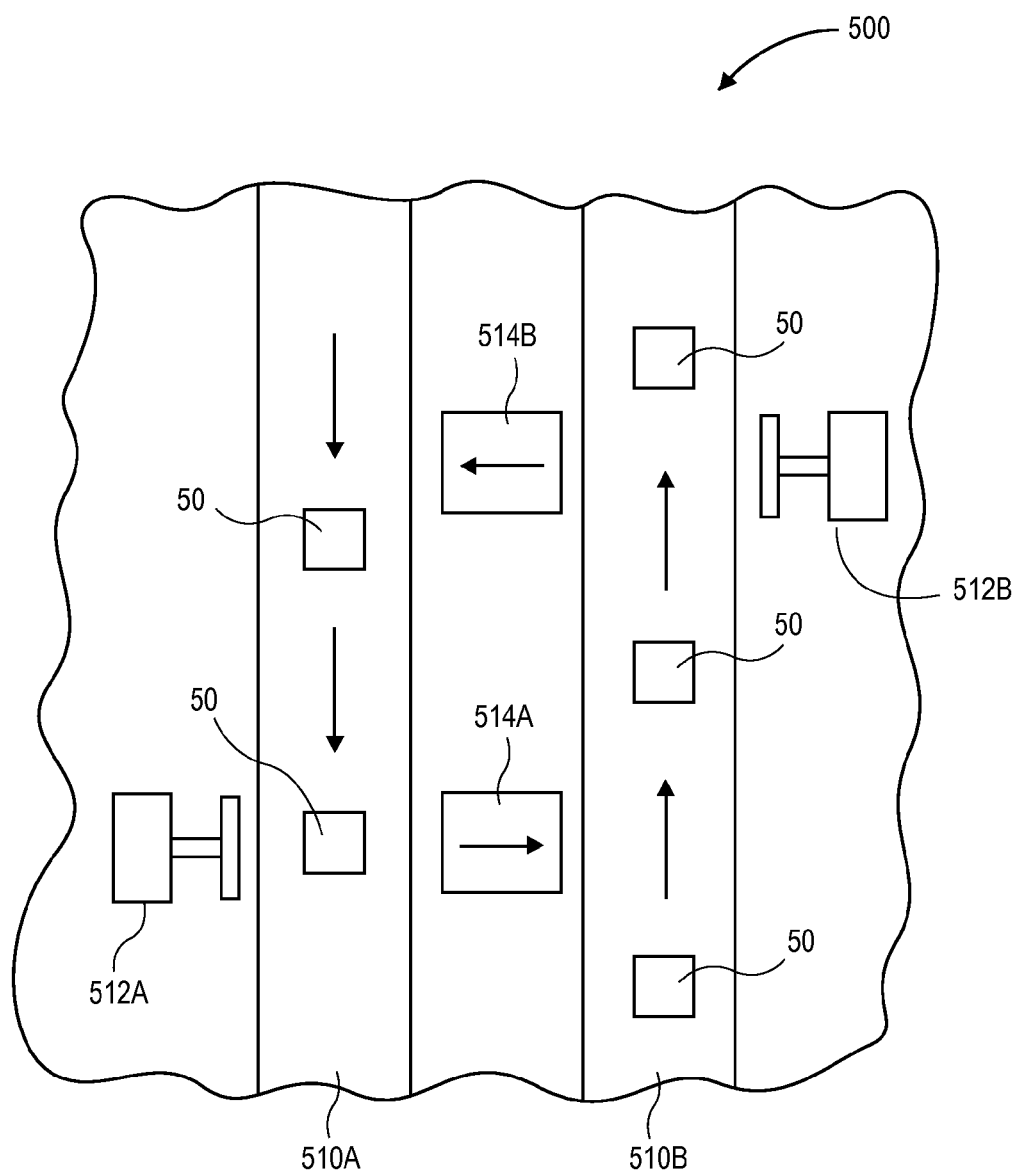
FIG. 5 is a pictorial diagram illustrating components for transferring items between conveyors of a dedicated network delivery system in accordance with the present disclosure.

As is discussed above, the systems and methods disclosed herein may provide a dedicated network delivery system having mover systems aligned in a hub-and-node configuration or in one or more substantially concentric loops. The mover systems may be aligned in a unidirectional manner, such that items may travel thereon in a single direction at a time, or in a bi-directional manner, such that multiple items may travel thereon in substantially opposing directions at once. Referring to FIG. 5, a pictorial diagram is shown illustrating components for transferring items between conveyors of a dedicated network delivery system 500 for transporting items 50 in accordance with the present disclosure. Except where otherwise noted, reference numerals preceded by the number "5" in FIG. 5 indicate components or features that are similar to components or features having reference numerals preceded by the number "1," "2," "3" or "4" in FIG. 1, 2, 3 or 4, respectively.

The system 500 of FIG. 5 comprises a pair of conveying systems 510A, 510B, a pair of diverters 512A, 512B and a pair of transfer surfaces 514A, 514B. As is shown in FIG. 5, the conveying systems 510A, 510B are provided for the purpose of carrying items 50 in opposing directions.

The conveying systems 510A, 510B of FIG. 5 may be provided within the system 500 as a portion of a hub-and-node configuration, e.g., in parallel between a hub and a node, or between hubs or nodes. Alternatively, the conveying systems 510A, 510B may be provided within the system 500 as a portion of a concentric arrangement having two or more loops aligned in the same or different directions, such as the looped main conveyor 310 of FIG. 3. Moreover, the diverters 512A, 512B are provided for the purpose of transferring the items 50 from one of the conveying systems 510A, 510B to another of the conveying systems 510A, 510B by way of the transfer surfaces 514A, 514B. For example, where one of the items 50 is traveling on the conveying system 510B, the diverter 512A may be instructed to push the item 50 across the transfer surface 514B and onto the conveying system 510A, thereby causing the item 50 to automatically reverse course. Therefore, where a dedicated network delivery system comprises some or all of the components shown in the system 500 of FIG. 5 (or like components), an item 50 may be automatically placed into motion at a first location and caused to travel toward a second destination, only to be automatically redirected to a third destination, as needed, and in accordance with the present disclosure. Any form of diverter may be provided for transferring items between conveying systems in accordance with the present disclosure.

Figure 6A:
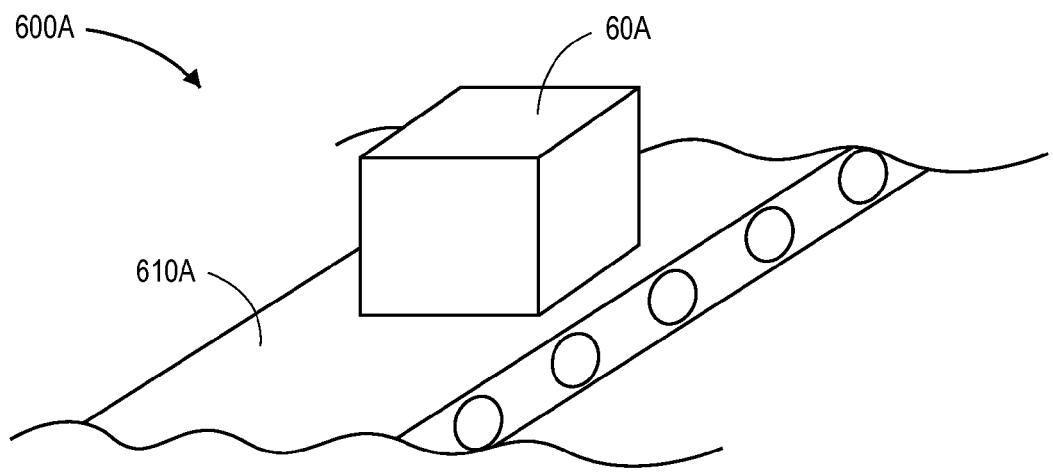
FIGS. 6A and 6B are pictorial diagrams illustrating portions of a dedicated network delivery system for carrying items in accordance with the present disclosure.
Figure 6B:
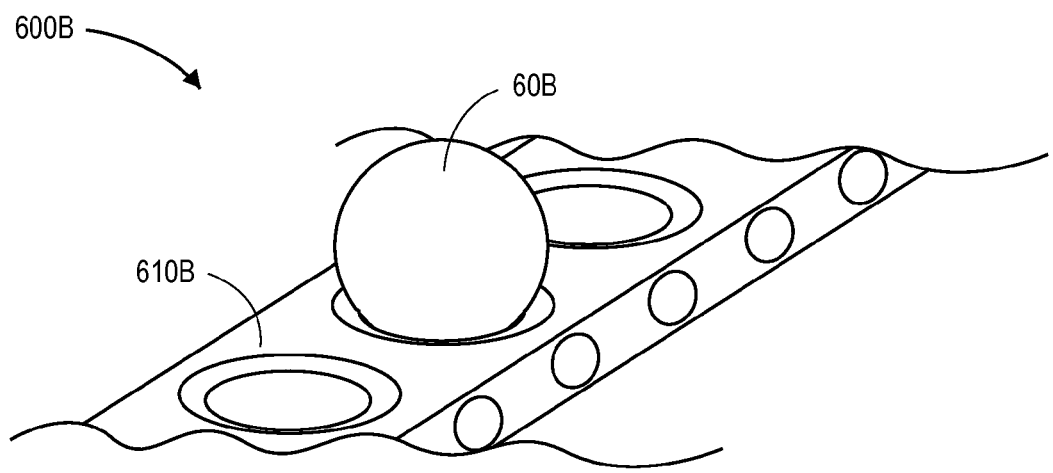

The mover systems utilized by network delivery systems of the present disclosure may take any form, and may be configured to accommodate objects of any size or shape. For example, the conveying systems may include belted conveyors without any hooks, notches or holding extensions thereon for securing items thereto. Alternatively, the conveying systems may include indents or shaped receptacles for securing items therein. Referring to FIGS. 6A and 6B, pictorial diagrams are shown illustrating portions of dedicated network delivery systems 600A, 600B for transporting items 60A, 60B in accordance with the present disclosure. Except where otherwise noted, reference numerals preceded by the number "6" in FIG. 6A or 6B indicate components or features that are similar to components or features having reference numerals preceded by the number "1," "2," "3," "4" or "5" in FIG. 1, 2, 3, 4 or 5, respectively.

As is shown in FIG. 6A, the conveying system 610A is a belted conveyor without any holding extensions. Therefore, the conveying system 610A may be used to deliver items of varying sizes and shapes, such as the item 60A, in one or more directions. For example, a suitable surface of the item 60A may be placed upon the conveying system 610A, such that the surface of the item 60A provides a sufficient resistance to friction in order to enable the item 60A to be transported between two or more locations within the conveying system 600A on the conveying system 610A.

As is shown in FIG. 6B, the conveying system 610B is also a belted conveyor having a holding extension in the form of a rounded perforation. Therefore, the conveying system 610B may be used to deliver items of a substantially spherical shape, such as the item 60B, in one or more directions. For example, the item 60B may be rolled or positioned into one of the rounded perforations, which may be specifically indexed and registered as including the item 60B. Thus, the system 600B may cause the rounded perforation including the item 60B to be transported to a predetermined location, at which the item 60B may be transferred to another conveying system of any type, or to an intended recipient of the item 60B at the location. Any type or form of device for securing any size or shape of object within a conveying system may be provided in accordance with the present disclosure. For example, an item may have a base including a substantially square, rectangular, or triangular shape, and a conveying system may include one or more perforations that are sized and shaped accordingly.

As is also discussed above, elements or segments of the dedicated network delivery systems of the present disclosure may be provided at one or more subterranean depths, or at one or more aboveground elevations, such as is shown in FIG. 2 with regard to the branches 210A, 210B, 210C of the main conveyor of FIG. 2, including the aboveground branch 210A and the subterranean branches 210B, 210C. Objects may be transported between elements or segments of such systems at various depths or elevations in any manner, including belted conveyors or other mover systems provided at any slope or angle, or any type or form of conveying elevator device.

Figure 7:
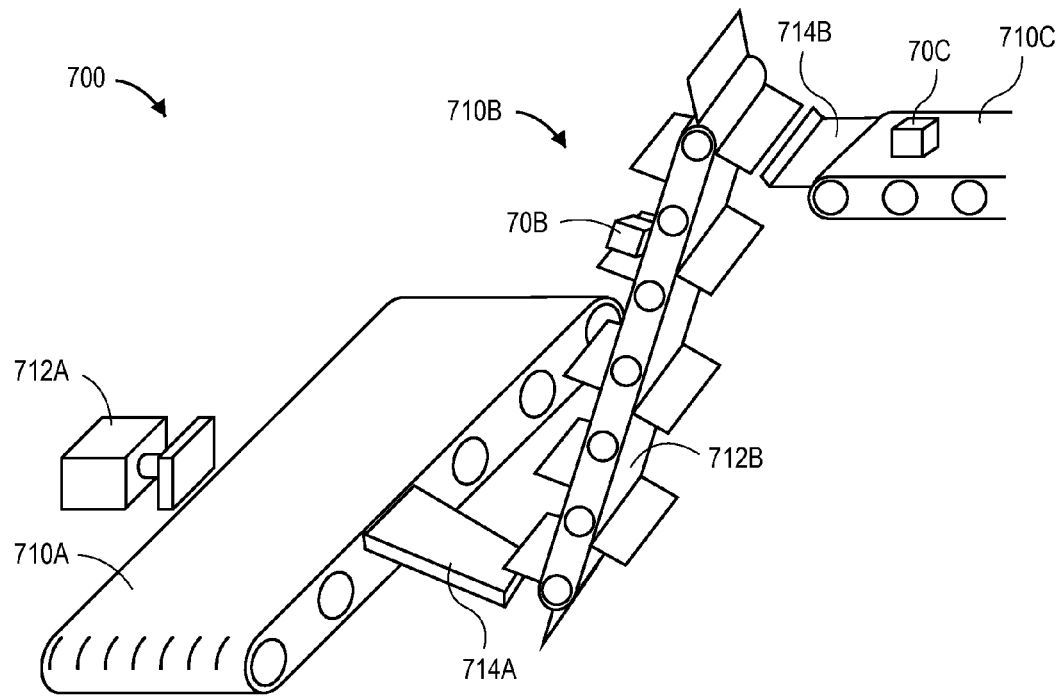
FIG. 7 is a pictorial diagram illustrating components for transferring items from a first conveyor of a dedicated network delivery system at a first elevation to a second conveyor of the dedicated network delivery system at a second elevation in accordance with the present disclosure.
Figure 8:
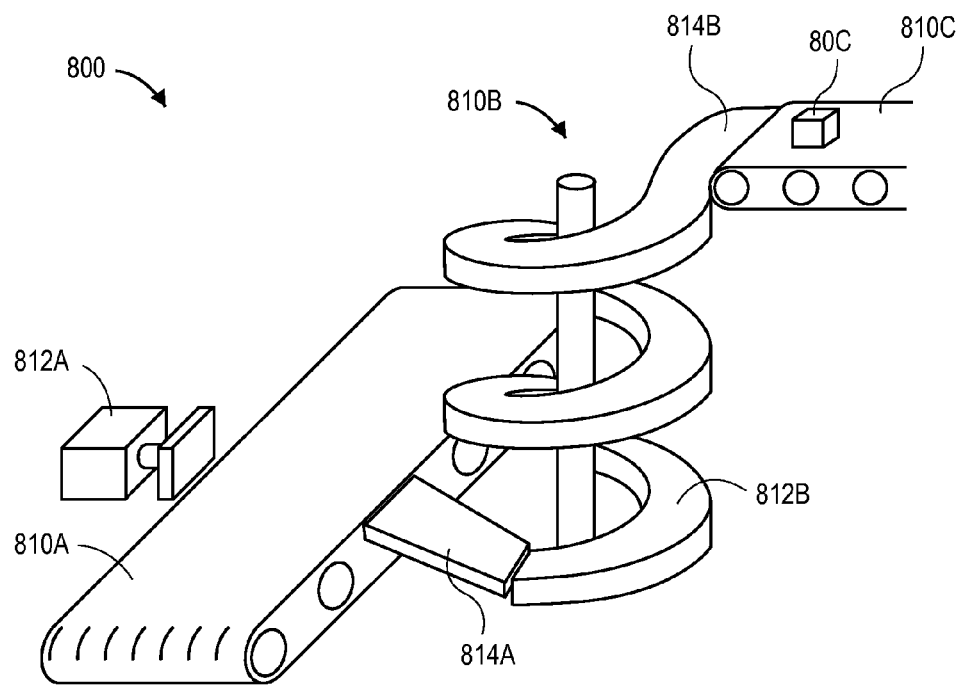
FIG. 8 is a pictorial diagram illustrating components for transferring items from a first conveyor of a dedicated network delivery system at a first elevation to a second conveyor of the dedicated network delivery system at a second elevation in accordance with the present disclosure.

Referring to FIGS. 7 and 8, pictorial diagrams are shown illustrating components for transferring items from a first conveyor of dedicated network delivery systems 700, 800 at a first elevation to a second conveyor of the dedicated network delivery systems 700, 800 at a second elevation in accordance with the present disclosure. Except where otherwise noted, reference numerals preceded by the numbers "7" or "8" in FIG. 7 or 8 indicate components or features that are similar to components or features having reference numerals preceded by the number "1," "2," "3," "4," "5" or "6" in FIG. 1, 2, 3, 4, 5, 6A or 6B, respectively.

As is shown in FIG. 7, the system 700 includes a pair of main conveying systems 710A, 710C configured in a transverse (viz., perpendicular) alignment with regard to one another, and at different elevations. The system 700 further includes a conveying elevator 710B having a bucketed conveyor belt 712B extending between the main conveying systems 710A, 710C, a diverter 712A and a transfer surface 714A for transferring items from the main conveying system 710A to the conveying elevator 710B, and a transfer surface 714B for transferring items from the conveying elevator 710B to the main conveying system 710C.

As is shown in FIG. 8, the system 800 also includes a pair of main conveying systems 810A, 810C configured in a transverse (viz., perpendicular) alignment with regard to one another, and at different elevations. The system 800 further includes a spiraled conveying elevator 810B having a spiraled conveyor belt 812B extending between the main conveying systems 810A, 810C, a diverter 812A and a transfer surface 814A for transferring items from the main conveying system 810A to the spiraled conveying elevator 810B, and a transfer surface 814B for transferring items from the spiraled conveying elevator 810B to the main conveying system 810C.

Therefore, according to the present disclosure, a network delivery system may comprise mover system components operating along any axis and at any depth or elevation, and may transport objects of any type, kind or size between and among such mover system components using diverters for changing a direction of such objects within a horizontal dimension, as well as angled or sloped mover systems, or conveying elevator systems, for changing a direction of such objects in a vertical dimension. Such diverters, conveying elevator systems or like components may be automatically controlled in order to move objects from one location to another in any direction or dimension. The network delivery systems of the present disclosure are not limited in their capacity to change a direction, an elevation or a depth of an item, and may use components in addition to the conveying elevator 710B or the spiraled conveying elevator 810B shown in FIG. 7 and FIG. 8, respectively. For example, a spiraled rail conveyor may be folded around a building or other structure in order to accommodate changes in vertical depth or elevation within a short distance. Moreover, the mover system components, diverters, conveying elevator systems or like components may be individually or collectively operated by one or more computerized control systems in order to cause an object to be transported between points or nodes within a network delivery system.

As is also discussed above, the network delivery systems of the present disclosure may comprise a single type or form of mover system, such as a belted conveyor system, a static rail system having one or more movable carriers thereon, a moving belt system, or pipes or conduits that are substantially filled with water traveling at one or more speeds. Alternatively, the network delivery systems of the present disclosure may comprise multiple mover systems working in conjunction with one another. Such mover systems may have different operational characteristics or capacities.

For example, within a network delivery system of the present disclosure, an item ordered by a customer from an electronic marketplace may be transported from a first location, e.g., a hub associated with a fulfillment center, to a second location, e.g., a node located between the fulfillment center and a customer, by way of a first mover system. At the second location, the item may be transferred from the first mover system to a second mover system, and transported to a third location, which may be associated with the customer, e.g., such as one of the termini 334A, 334C associated with a home of the customer 330A, 330B, a terminus 330C associated with an apartment building having customers 330C therein or a terminus 360 associated with a locker storage facility 360. The first mover system may operate at a first speed or have a first capacity, e.g., a high-speed maglev train or hyperloop system, that may be appropriate for delivering items at high speeds or for long distances, while the second mover system may operate at a second speed or have a second capacity, e.g., a belted conveyor system or narrow-gage rail system, that may be appropriate for delivering items at slower speeds or for shorter distances.

Furthermore, the dedicated network delivery systems may be constructed with tunnels, bridges, beds or other features that are sufficiently sized in order to accommodate the mover systems, the diversion systems and/or the carriers of the present disclosure. For example, in some applications, where a segment of a dedicated network delivery system is known or expected to experience elevated levels of traffic or demand, or to carry large items, larger mover systems (e.g., wider belted conveyors) passing through taller tunnels or along sturdier bridges may be provided. In other applications, where a segment of a dedicated network delivery system is known or expected to experience reduced levels of traffic or demand, or to carry small items, smaller mover systems (e.g., narrower belted conveyors) passing through shorter tunnels or along lighter bridges may be provided. The various aspects (e.g., mover systems, diversion systems and/or carriers) of the dedicated network delivery systems of the present disclosure may be selected on any basis, and any corresponding structures, facilities or components of any size, shape or capacity may be provided accordingly, as necessary.

Figure 9:
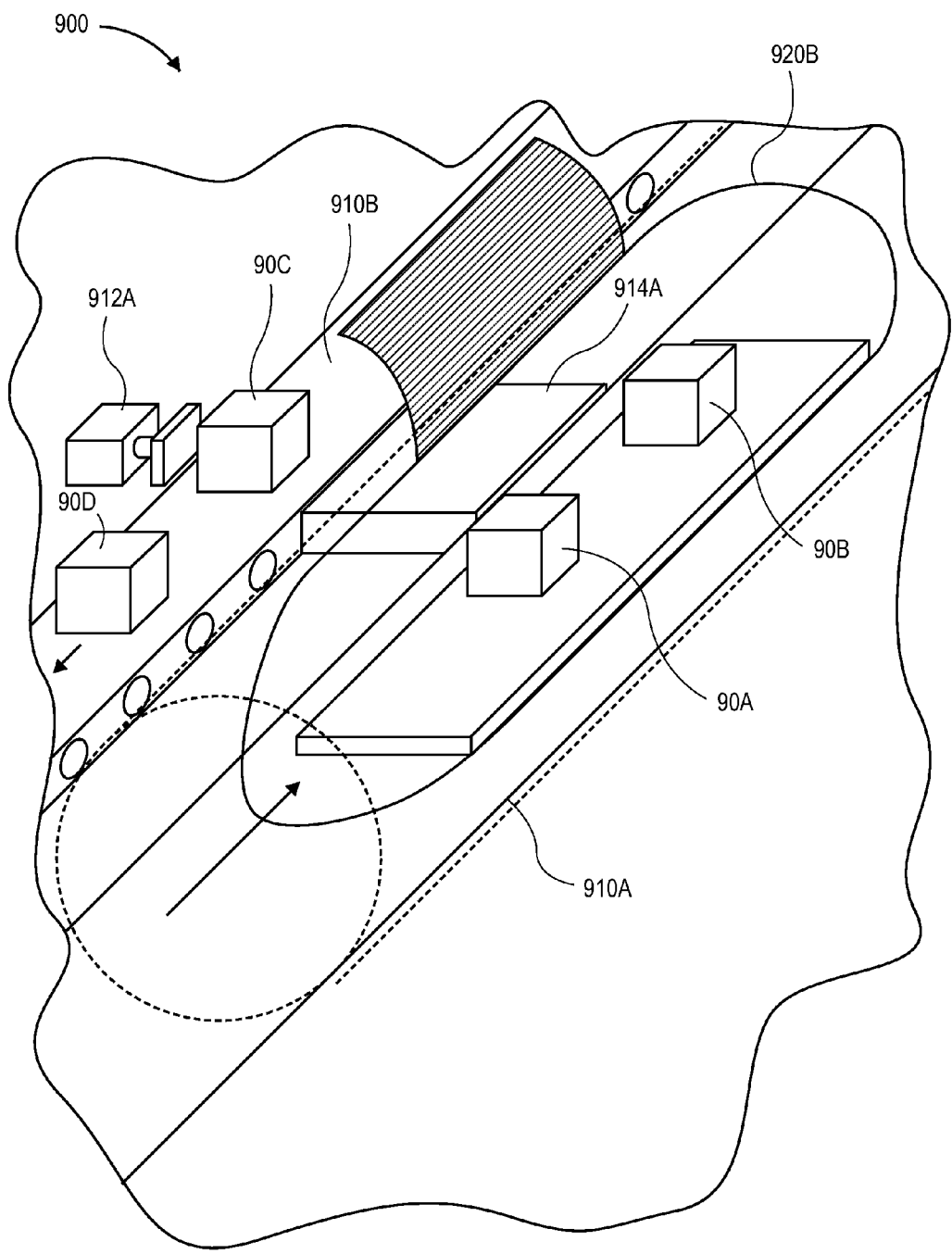
FIG. 9 is a pictorial diagram illustrating conveying systems for transporting items between nodes of a dedicated network delivery system and diversion systems for transferring items between conveying systems of the dedicated network delivery system in accordance with the present disclosure.
Figure 10:
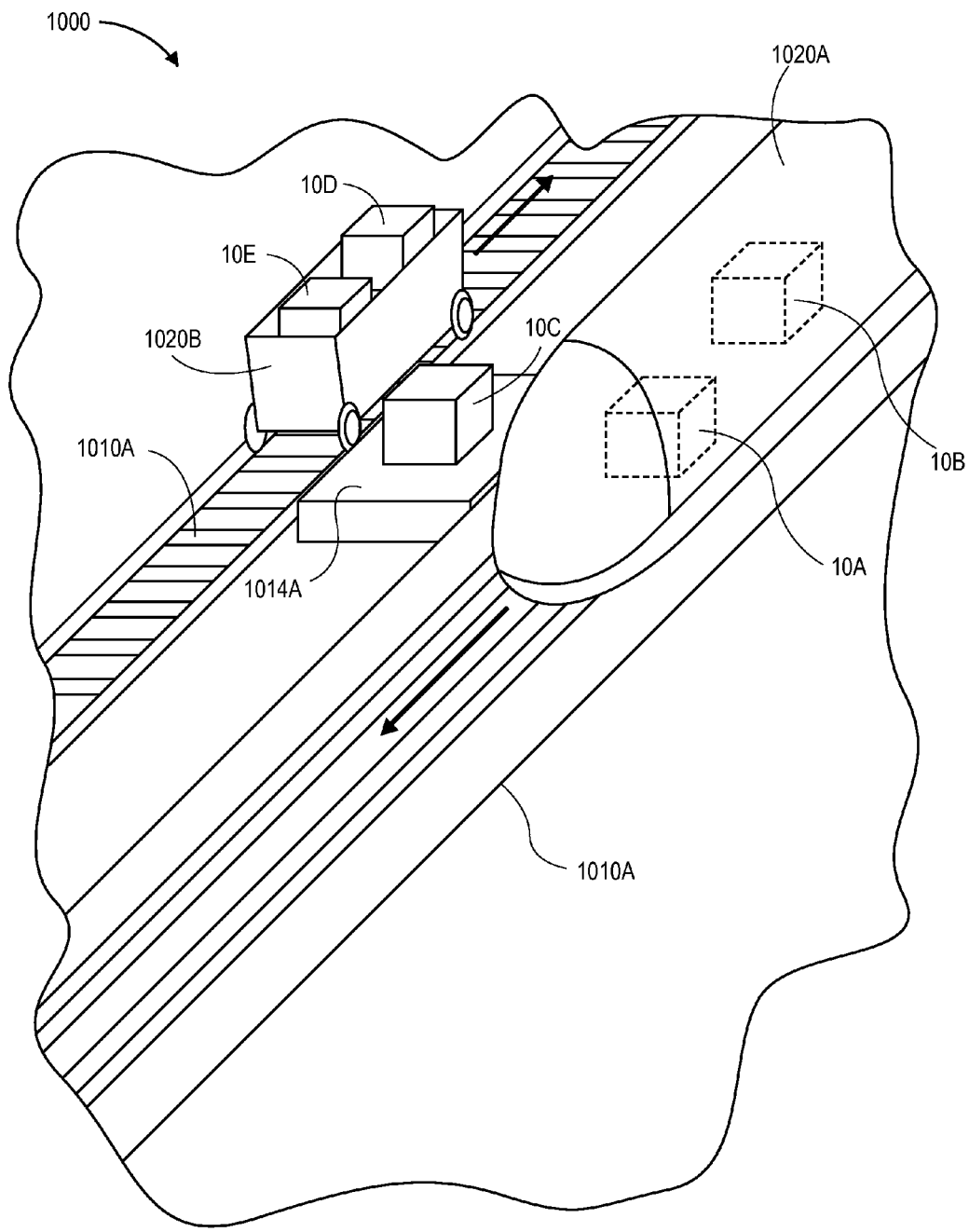
FIG. 10 is a pictorial diagram illustrating conveying systems for transporting items between nodes of a dedicated network delivery system and diversion systems for transferring items between conveying systems of the dedicated network delivery system in accordance with the present disclosure.

Referring to FIGS. 9 and 10, pictorial diagrams illustrating conveying systems for transporting items between nodes of dedicated network delivery systems 900, 1000 and diversion systems for transferring items between such systems 900, 1000 in accordance with the present disclosure are shown. Except where otherwise noted, reference numerals preceded by the numbers "9" or "10" in FIG. 9 or 10 indicate components or features that are similar to components or features having reference numerals preceded by the number "1," "2," "3," "4," "5," "6," "7" or "8" in FIGS. 1, 2, 3, 4, 5, 6A and 6B, 7 or 8, respectively.

As is shown in FIG. 9, the system 900 includes a hyperloop conveying system 910A and a belted conveyor system 910B. The hyperloop conveying system 910A may be any type or form of system having a low-pressure or vacuum tube including a plurality of capsules 920A that may travel within the tube at controllable speeds between two or more locations. Such capsules may be suspended aloft within the tube on one or more cushions of air, and may be powered using one or more magnetic accelerators (e.g., linear induction motors), and may transport one or more items 90A, 90B therein. Hyperloop capsules may be transported within such tubes at speeds exceeding seven hundred miles per hour (700 mph). The belted conveyor system 910B may be any form of conveying system having one or more belts that may transport a plurality of items 90C, 90D thereon. Typical belted conveyors may operate at speeds ranging from approximately sixty-five feet per minute to approximately three thousand feet per minute (65 to 3,000 fpm), or about seven-tenths of a mile per hour to about thirty-three miles per hour (0.7 to 33 mph). Additionally, the system 900 further includes a diverter 912A for transferring items from the belted conveyor system 910B to the hyperloop conveying system 910A, or vice versa, along a transfer surface 914A.

As is shown in FIG. 10, the system 1000 includes a maglev rail conveying system 1010A and a narrow-gage rail conveying system 1010B. The maglev rail conveying system 1010A may be any type or form of magnetic levitation train system including one or more carriers 1020A that may operate in a low-friction environment according to electromagnetic suspension, electrodynamic suspension or any other levitational device. Some such maglev trains may reach speeds of over three hundred miles per hour (300 mph). The narrow-gage rail conveying system 1010A may include one or more powered rail carriers 1020A for transporting items 10D, 10E therein. The narrow-gage rail conveying system 1010B may be a rail system having specially sized carrier cars, such as the carrier 1020B of FIG. 10, that are particularly adapted for the transportation of lighter items or objects, or along rails having tighter turn radii or steeper changes in elevation. The system 1000 further includes a diverter 1012A for transferring items from the maglev rail conveying system 1010A to the narrow-gage conveying system 1010B, or vice versa, along the transfer surface 1014A.

Accordingly, the network delivery systems of the present disclosure may include any number, type or form of mover systems, including but not limited to belted conveyors or any type or form of static rail system, such as are shown in FIG. 9 or FIG. 10, and such mover systems may operate in conjunction with one another in order to accomplish the transportation of objects between two or more locations.

As is discussed above, the transportation of objects within a network delivery system may be centrally controlled by the transmission of one or more instructions or commands from a control system, such that the objects traveling thereon may be delivered from one location to another outside of a traditional transportation network, and without requiring any manned intervention. More particularly, once an item has been designated for delivery, the item may enter the network delivery system, e.g., from the fulfillment center 320 by way of one or more of fulfillment center extensions 322, as is shown in FIG. 3, and be caused to travel along one or more mover systems, e.g., the main conveyor 310 of FIG. 3, before arriving at an intended destination, where the item may exit the network delivery system, e.g., by way of one or more customer extensions 332A, 332B, 332C, automatically and without any interaction by one or more human operators.

Figure 11:
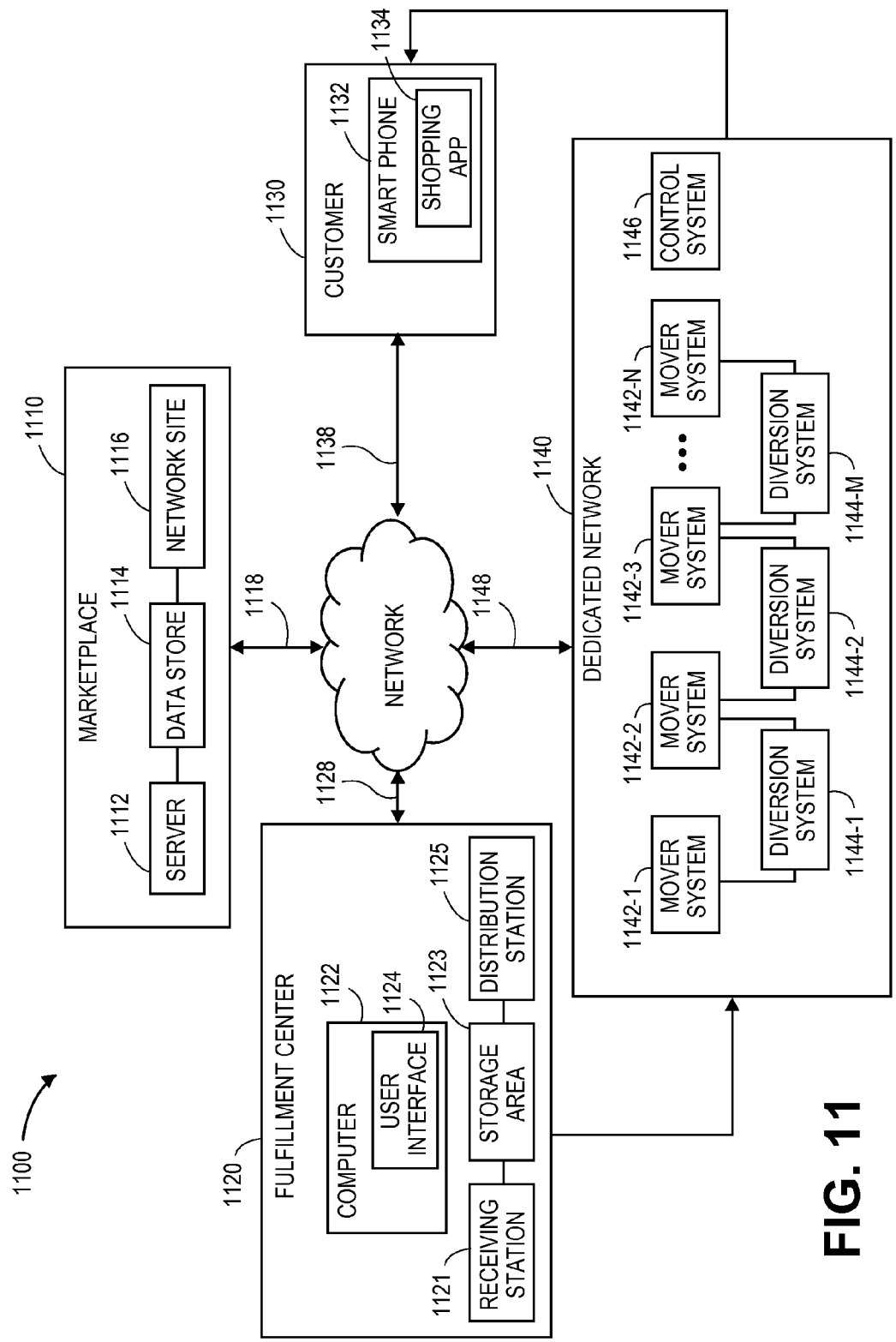
FIG. 11 is a block diagram of components of a dedicated network delivery system for transporting items from a fulfillment center to a customer in accordance with the present disclosure.

Referring to FIG. 11, a block diagram is shown of illustrative components of a dedicated network delivery system 1100 for transporting items from a fulfillment center 1120 to a customer 1130. The system 1100 comprises a marketplace 1100, the fulfillment center 1120, the customer 1130 and a delivery network 1140 that are connected to one another across a communications network 1150, such as the Internet. Although the system 1100 is shown as transporting items from the fulfillment center 1120 to the customer 1130 by way of the dedicated network 1140, the systems and methods of the present disclosure are not so limited, and may be utilized when transporting items between two or more locations for any specific purpose.

The marketplace 1110 may be any entity or individual that intends to make items from a variety of sources (e.g., vendors, manufacturers, merchants) available for download, purchase, rent, lease or borrowing by customers using a networked computer infrastructure, including one or more physical computer servers 1112 and data stores 1114 for hosting a network site 1116. The marketplace 1110 may be physically or virtually associated with one or more storage or distribution facilities, such as the fulfillment center 1120. The network site 1116 may be implemented using the one or more servers 1112, which connect or otherwise communicate with the one or more data stores 1114 as well as the network 1150, as indicated by line 1118, through the sending and receiving of digital data. Moreover, the data stores 1114 may include any type of information regarding items that have been made available for sale through the marketplace 1110, or ordered by customers from the marketplace 1110.

The fulfillment center 1120 may be any facility that is adapted to receive, store, process and/or distribute items. As is shown in FIG. 11, the fulfillment center 1120 includes a computer 1122, as well as stations for receiving, storing and distributing items to customers, including but not limited to a receiving station 1121, a storage area 1123 and a distribution station 1125.

The fulfillment center 1120 may operate one or more order processing and/or communication systems using a computing device such as the computer 1122 and/or software applications having one or more user interfaces 1124 (e.g., a browser), or through one or more other computing devices or machines that may be connected to the network 1150, as is indicated by line 1128, in order to transmit or receive information in the form of digital or analog data, or for any other purpose. The computer 1122 may also operate or provide access to one or more reporting systems for receiving or displaying information or data regarding workflow operations, and may provide one or more interfaces, such as the user interface 1124, for receiving interactions (e.g., text, numeric entries or selections) from one or more operators, users or workers in response to such information or data. The computer 1122 may be a device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

The receiving station 1121 may include any apparatuses that may be required in order to receive shipments of items at the fulfillment center 1120 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The storage area 1123 may include one or more predefined two-dimensional or three-dimensional spaces for accommodating items and/or containers of such items, such as aisles, rows, bays, shelves, slots, bins, racks, tiers, bars, hooks, cubbies or other like storage, or any other appropriate regions or stations. The distribution station 1125 may include one or more regions or stations where items that have been retrieved from a designated storage area may be evaluated, prepared and packed for delivery from the fulfillment center 1120 to addresses, locations or destinations specified by customers, also by way of carriers such as cars, trucks, trailers, freight cars, container ships or cargo aircraft (e.g., manned aircraft or unmanned aircraft, such as drones). Those skilled in the pertinent arts will recognize that shipments of items arriving at the receiving station 1121 may be processed, and the items placed into storage within the storage areas 1123 or, alternatively, transferred directly to the distribution station 1125, or "cross-docked," for prompt delivery to one or more customers.

The fulfillment center 1120 may further include one or more control systems (not shown in FIG. 11) that may generate instructions for conducting operations at one or more of the receiving station 1121, the storage area 1123 or the distribution station 1125. Such control systems may be associated with the computer 1122 or with one or more other computing devices or machines, and may communicate with such devices or machines by any known wired or wireless connection, or with the marketplace 1110 or the customer 1130 over the network 1150, as indicated by line 1128, through the sending and receiving of digital data.

Additionally, the fulfillment center 1120 may include one or more systems or devices (not shown in FIG. 11) for determining a location of one or more elements therein, such as cameras or other image recording devices. Furthermore, the fulfillment center 1120 may also include one or more workers or staff members, who may handle or transport items within the fulfillment center 1120. Such workers may operate one or more computing devices or machines for registering the receipt, retrieval, transportation or storage of items within the fulfillment center, such as the computer 1122, or a device such a personal digital assistant, a digital media player, a smartphone, a tablet computer, a desktop computer or a laptop computer, and may include any form of input and/or output peripherals such as scanners, readers, keyboards, keypads, touchscreens or like devices.

The customer 1130 may be any entity or individual that wishes to download, purchase, rent, lease, borrow or otherwise obtain items (which may include goods, products, services or information of any type or form) from the marketplace 1110. The customer 1130 may utilize one or more computing devices, such as a smartphone 1132 or any other like machine that may operate or access one or more software applications, such as a browser (not shown) or a shopping application 1134, and may be connected to or otherwise communicate with the marketplace 1110 or the fulfillment center 1130 through the network 1150, as indicated by line 1138, by the transmission and receipt of digital data. Moreover, the customer 1130 may also receive deliveries or shipments of one or items from facilities maintained by or on behalf of the marketplace 1110, such as the fulfillment center 1120, by way of the dedicated delivery network 1140.

The dedicated delivery network 1140 comprises a plurality of n mover systems 1142-1, 1142-2 . . . 1142-n and a plurality of m diversion systems 1144-1, 1144-2 . . . 1144-m for transporting items from the fulfillment center 1120 to the customer 1130, and a control system 1146. The mover systems 1142-1, 1142-2 . . . 1142-n may comprise any number of components for causing the transportation of items from one location to another, including one or more belted conveyor systems, static rail or moving rail systems, rack-and-pinion systems or the like. For example, such mover systems 1142-1, 1142-2 . . . 1142-n may include stationary carriers and moving conveyors, such as is shown with regard to the belted conveyor system 910B of FIG. 9, or moving carriers and stationary rails, such as is shown with regard to the hyperloop conveying system 910A of FIG. 9. Moreover, the mover systems 1142-1, 1142-2 . . . 1142-n may further include any necessary extensions and/or termini may be required in order to transfer items into or out of the delivery network 1140, such as the conveyor extension 132 or the conveyor terminus 134 associated with the customer 130 of FIG. 1, at one or more locations.

The diversion systems 1144-1, 1144-2 . . . 1144-m are provided for the purpose of transferring items from one of the mover systems 1142-1, 1142-2 . . . 1142-n to another of the mover systems 1142-1, 1142-2 . . . 1142-n. Such diversion systems 1144-1, 1144-2 . . . 1144-m may include, but are not limited to, pusher diverters, steered wheel diverters or any other type of diverters or diversion systems for transferring objects from one mover system to another, and at any elevation or depth. Any type of diverters or diversion systems may be utilized to transfer objects from one element or segment of a network delivery system to another element or segment in accordance with the present disclosure.

The control system 1146 may control any aspect of the operation of the various mover systems 1142-1, 1142-2 . . . 1142-n or the various diversion systems 1144-1, 1144-2 . . . 1144-m, or any other related systems, within the dedicated network 1140. For example, the control system 1146 may define a path between an origin and a destination, e.g., between the fulfillment center 1120 and the customer 1130, for transporting an object along one or more of the mover systems 1142-1, 1142-2 . . . 1142-n, such as by selecting one or more particular mover systems 1142-1, 1142-2 . . . 1142-n or diversion systems 1144-1, 1144-2 . . . 1144-m for causing the delivery of the object according to any defined purpose and consistent with any particular requirements. Additionally, the control system 1146 may transmit one or more instructions or commands for controlling the operation of various components of the mover systems 1142-1, 1142-2 . . . 1142-n (e.g., belts, chains, screws, rails tracks or rollers of conveyor systems, powered carriers operating on static rails or mobile rails or the like) or the diversion systems 1144-1, 1144-2 . . . 1144-m, such as by causing a pusher diverter or a steered wheel diverter to move an item from one conveyor to another.

The control system 1146 may be provided as a freestanding system or facility associated with the dedicated network 1140. Alternatively, the control system 1140 may be further provided in connection with one or more other components of the system 1100 of FIG. 11, such as the marketplace 1110 or the fulfillment center 1120. For example, the control system 1146 may be provided in connection with the server 1112 or with one or more other computer-related components of the marketplace 1110, and may be integrated with one or more aspects of the processes by which orders may be received from the customer 1130 or assigned to the fulfillment center 1120. Alternatively, the control system 1146 may be provided in connection with the computer 1122 or with one or more other computer-related components of the fulfillment center 1120, and may be integrated with one or more aspects of the processes by which orders may be fulfilled on behalf of the customer 1130 from the fulfillment center 1120.

Additionally, the control system 1146 may include one or more computers, servers and/or devices featuring the necessary electronics, software, memory, storage, databases, firmware, logic/state machines, microprocessors, communication links, displays or other visual or audio user interfaces, printing devices, and any other input/output interfaces to provide any of the functions or services regarding the operation of any one of the various mover systems 1142-1, 1142-2 . . . 1142-n or the various diversion systems 1144-1, 1144-2 . . . 1144-m within the dedicated network 1140. Such computers, servers and/or devices may be operated independently, or may receive instructions or commands from one or more external computer devices or system components, such as the server 1112 or the computer 1122, by way of the network 1150, as indicated by line 1148, through the sending and receiving of digital data.

For example, according to the systems and methods of the present disclosure, an order for the purchase of an item may be received from the customer 1130 by the marketplace 1110 through the marketplace network site 1116. Upon acknowledging the receipt of the order, the marketplace server 1112 may provide one or more instructions for fulfilling the order to the fulfillment center 1120 over the network 1150. Such instructions may be received at the computer 1122, which may then instruct one or more workers to retrieve the item from the storage area 1123 and to prepare the item for delivery to the customer 1130 at the distribution station 1125, such as by placing the item in a suitable container with an appropriate amount and type of dunnage.

Once the item has been prepared for delivery, a path for transporting the item from the fulfillment center 1120 to the customer 1130 by way of the dedicated network 1140 may be defined by the control system 1146, which may transmit one or more instructions for causing the item to be automatically transferred from the distribution station to the dedicated network 1140 by way of one or more extensions or termini associated with the fulfillment center 1120, such as the fulfillment center extension 322 of FIG. 3. The control system 1146 may transmit further instructions for causing the item to be automatically transferred to the mover system 1142-1, or for causing the item to travel to a location associated with the customer 1130 by way of one or more of the other mover systems 1142-2 . . . 1142-*n*. Upon its arrival at the location associated with the customer 1130, the control system 1146 may transmit further instructions for causing the item to be automatically transferred from one of the mover systems 1142-2 . . . 1142-*n* to an extension associated with the customer 1130, such as one of the extensions 332A, 332B, 332C of FIG. 3. Accordingly, an object may be automatically delivered from an origin to a destination, e.g., from a fulfillment center 1120 to a customer 1130, by way of a dedicated delivery network 1140 having any number of mover systems 1142-1, 1142-2 . . . 1142-*n* using any number of diversion systems 1144-1, 1144-2 . . . 1144-*m*, each of which may be individually or collectively operated by the control system 1146, or by one or more other computerized control systems.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those skilled in the pertinent arts will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those skilled in the pertinent arts will understand that process elements described herein as being performed by a "marketplace," a "fulfillment center," a "customer" or a "delivery network" or like terms, may be automated steps performed by their respective computer systems, or implemented within software modules (or computer programs) executed by one or more general purpose computers. Moreover, process steps described as being performed by a "marketplace," a "fulfillment center," a "customer" or a "delivery network" may be typically performed by a human operator, but could, alternatively, be performed by an automated agent.

The marketplace 1110, the fulfillment center 1120, the customer 1130 and/or the fulfillment center 1140 may use any network-enabled or Internet applications or features, or any other client-server applications or features including electronic mail (or E-mail), or other messaging techniques, to connect to the network 1150 or to communicate with one another, such as through short or multimedia messaging service (SMS or MMS) text messages. For example, the fulfillment center 1120 and/or the computer 1122 may be adapted to transmit information or data in the form of synchronous or asynchronous messages to the server 1112, the server 1112, the smartphone 1132, the control system 1146 or any other computer device in real time or in near-real time, or in one or more offline processes, via the network 1150. Those skilled in the pertinent arts would recognize that the marketplace 1110, the fulfillment center 1120, the customer 1130 or the dedicated network 1140 may operate any of a number of computing devices that are capable of communicating over the network, including but not limited to set-top boxes, personal digital assistants, digital media players, tablets, pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components or modules) described herein may be stored on a computer-readable medium that is within or accessible by computers or computer components such as the server 1112, the computer 1122, the smartphone 1132 or the control system 1146, or any other computers or control systems utilized by the marketplace 1110, the fulfillment center 1120, the customer 1130 or the dedicated network 1140 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the non-transitory computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions.

Figure 12:
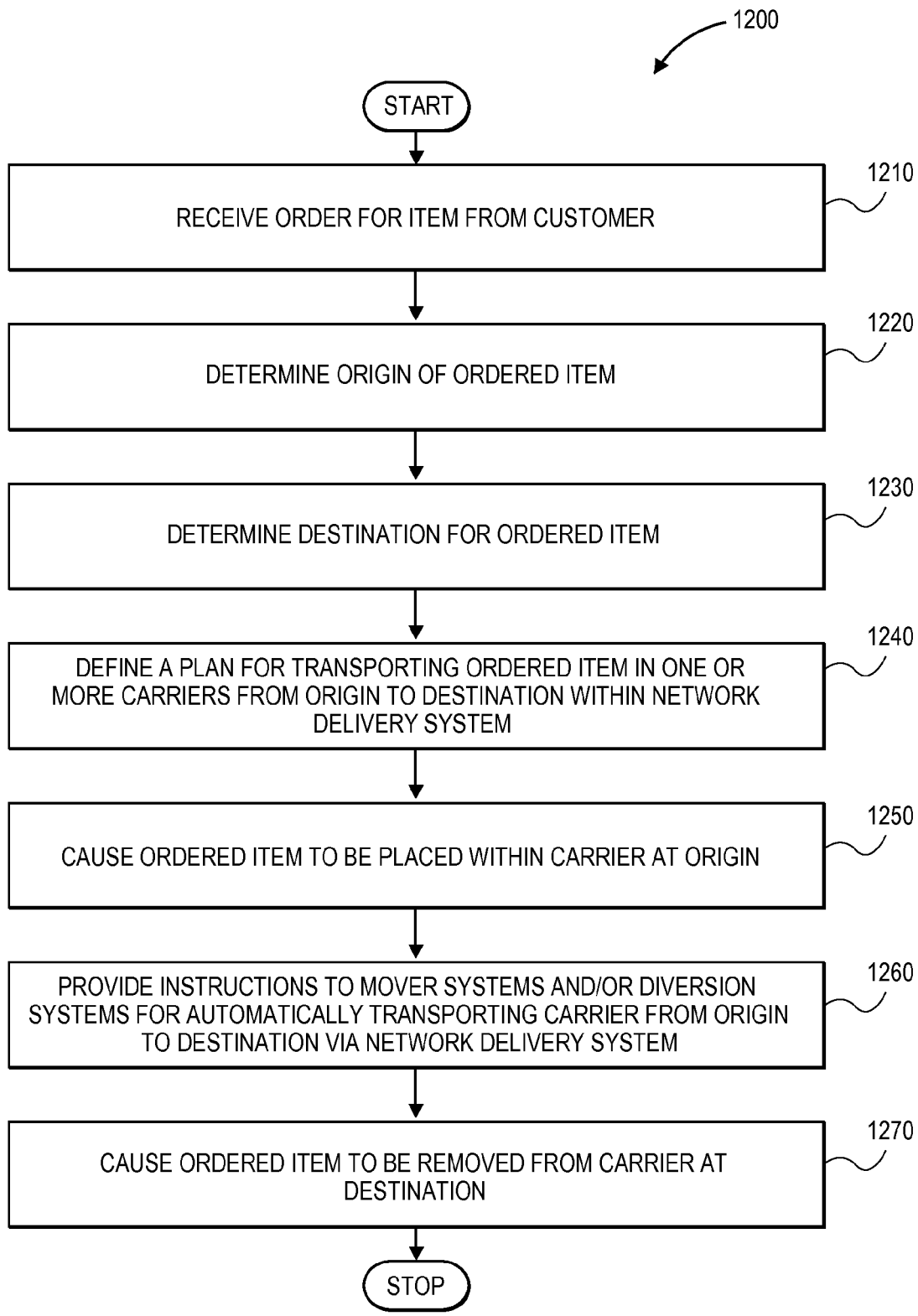
FIG. 12 is a flow diagram of an illustrative process for controlling the transportation of an ordered item from an origin to a destination using a dedicated network delivery system in accordance with the present disclosure.

As is discussed above, the systems and methods of the present disclosure may be configured to automatically transport an object, e.g., an item ordered from an electronic marketplace, from a source to a destination, such as from a fulfillment center or warehouse where the item is stored, to a location specified by the customer who placed the order for the item through a network delivery system. Once the object has been identified, and the source and the destination for the object have been determined, the systems and methods disclosed herein may cause the item to be transported automatically by way of one or more carriers on one or more mover systems. Referring to FIG. 12, a flow diagram 1200 is shown of an illustrative process for controlling the transportation of an ordered item from an origin to a destination using a dedicated network delivery system in accordance with the present disclosure.

At box 1210, an order is received from a customer. For example, the order may have been placed through a network site maintained by an electronic marketplace associated with a network delivery system, such as the network site 1116 maintained by the marketplace 1110 and the delivery network 1140 of FIG. 11, or by telephone through an operator associated with a vendor, a manufacturer or a merchant having access to such a delivery system. Alternatively, the order may have been placed by mail or in person.

At box 1220, an origin of the ordered item is determined, and at box 1230, a destination for the ordered item is determined. For example, upon receiving the order, one or more fulfillment centers, warehouses or other locations storing the ordered item may be identified, and a station or extension of a network delivery system associated with the origin may be identified. Similarly, a shipping address or other location to which the ordered item is to be delivered may be identified from the order, e.g., a home or office location of the customer, an address of an intended recipient where the ordered item is intended as a gift, or a convenient central location selected by the customer where the item is to be picked up; and a corresponding station or extension of the network delivery system may be identified.

At box 1240, a plan for transporting the ordered item within one or more carriers from the origin to the destination is defined. For example, a control system may define the plan based on any relevant factor regarding the delivery of the item by way of the network delivery system, including but not limited to the capacity or congestion associated with one or more mover systems, or the availability of carriers of an appropriate type or capacity to transport the ordered item. Additionally, where a network delivery system includes a variety of multi-modal mover systems for transporting items, such as the hyperloop conveying system 910A or the belted conveyor system 910B of FIG. 9, or the maglev rail conveying system 1010A or the narrow-gage rail conveying system 1010B of FIG. 10, the control system may define the plan by selecting one or more of such mover systems based on the available capacity for shipping the ordered item, or the cost of transporting the ordered item by way of each such mover system. The plan may further call for transporting the ordered item in multiple segments corresponding to multiple mover systems, such that the ordered item is transported for longer, unimpeded distances by way of a high-speed mover system such as a hyperloop conveying system or maglev rail conveying system, before being transferred to a low-speed mover system such as a belted conveying system or narrow-gage rail conveying system using one or more diversion systems.

At box 1250, the ordered item is placed within a carrier at the origin. For example, one or more workers may package the ordered item into a container with an appropriate type and amount of dunnage, and load the packaged ordered item into a carrier associated with a mover system. Alternatively, the ordered item may be transferred into a carrier associated with the mover system by one or more automatic devices or systems, including one or more automated conveying systems that may be associated with a facility located at the origin, such as a fulfillment center or warehouse.

At box 1260, instructions for automatically transporting the ordered item from the origin to the destination may be provided to the one or more carriers in accordance with the plan. For example, referring again to the system 1100 of FIG. 11, the control system 1146 may provide one or more sets of instructions for transporting the ordered item by way of one or more of the mover systems 1142-1, 1142-2 . . . 1142-$n$ and the plurality of m diversion systems 1144-1, 1144-2 . . . 1144-$m$, in order to cause the ordered item to travel between the origin and the destination in fulfillment of the order. At box 1270, the ordered item is removed from a carrier at the destination, and the process ends.

Accordingly, the systems and methods of the present disclosure may cause an automatic delivery of an object, such as an item ordered by a customer, from an origin to a destination in a controlled manner by way of a network delivery system, without requiring any interaction, or with minimal interaction, with traditional transportation networks or human operators. A control system can be provided information regarding an origin of the item, a destination for the item, the available facilities (e.g., mover systems or carriers, diversion systems and the like), and any utilization or congestion information associated with any aspect of the network delivery system. The delivery of the ordered item from an origin to a destination may be centrally controlled by a single control system associated with the network delivery system or, alternatively, by multiple control systems, such that control of the delivery may be transferred from a local control system to a remote control system as the ordered item travels from one geographic area to another.

Figure 13:
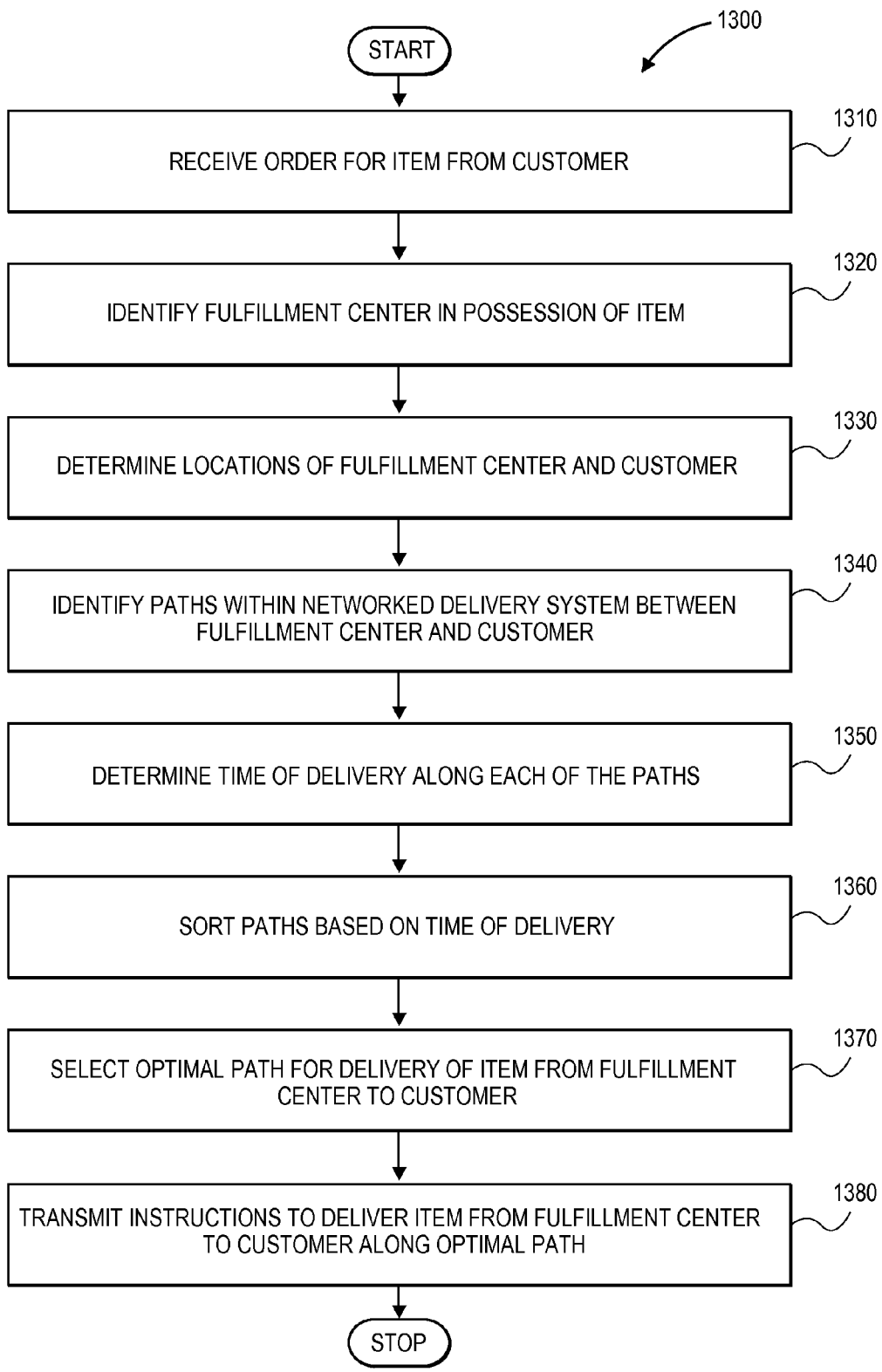
FIG. 13 is a flow diagram of an illustrative process for selecting a path for a delivery of an ordered item from a fulfillment center to a customer and controlling the delivery of the ordered item using a dedicated network delivery system in accordance with the present disclosure.

As is also discussed above, the systems and methods of the present disclosure may also identify an optimal path for a delivery of an object by way of a network delivery system based on any available information regarding the operation of the network delivery system. Such information may include, but is not limited to, the times or costs required in order to transport the object along one or more paths of the network delivery system, as well as any congestion or delays along such paths, or congestion or delays at one or more points or nodes of the network delivery system. Referring to FIG. 13, a flow diagram 1300 is shown of an illustrative process for selecting a path for a delivery of an ordered item from a fulfillment center to a customer and controlling the delivery of the ordered item using a dedicated network delivery system.

At box 1310, an order is received from a customer, and at box 1320, a fulfillment center in possession of the item is identified. For example, the customer may place the order through one or more electronic systems over the Internet, by telephone or mail, or in person, and one or more fulfillment centers, warehouses or like facilities having the item onsite may be identified. At box 1330, the locations of the customer and the fulfillment center are determined. For example, information regarding the street addresses associated with the customer and the fulfillment center, may be determined and provided to a control system. Where multiple fulfillment centers are in possession of the item, a fulfillment center that is most conveniently located with regard to the customer, or from which the item may be most efficiently delivered, may be selected.

At box 1340, one or more paths extending between the fulfillment center and the customer within a network delivery system are identified. For example, where the network delivery system includes a variety of segments extending between and among various points or nodes from the fulfillment center to the customer, a control system may identify the various available paths across such segments and through such points or nodes from the fulfillment center to the customer. As is discussed above, the network delivery system may be represented as a directed graph of points or nodes joined by segments having varying degrees of completion, such as a partially or completely directed acyclic graph without any directed cycles. The various paths formed by segments between such points or nodes may be defined according to any known algorithm or processes, including but not limited to Dijkstra's Algorithm, the Bellman-Ford Algorithm, the Floyd-Warshall Algorithm, Johnson's Algorithm or hub labeling, and associated with the order for the item.

At box 1350, times of delivery along each of the paths identified at box 1340 are determined. For example, a control system may determine the amount of time required to deliver an object along each of a plurality of mover systems extending between various points or nodes, as well as the amount of time required to pass through junctions associated with each of the points or nodes. The determination of such times of delivery may consider any relevant information or data regarding the operational capacities of a network delivery system as a whole, or of one or more segments or junctions of the system independently. For example, the current numbers and capacities of operational or available mover systems, diversion systems, carriers, extensions and the like may be determined for each of the paths defined at box 1340, and the amount of time required to transport the ordered item from the fulfillment center to the customer for each of such paths may be calculated by the control system. The times of delivery may be calculated with regard to any relevant information or data associated with the order, including any specific instructions or requirements for handling the ordered item, as well as any priority status assigned to the order or the ordered item, or any other factor.

At box 1360, the paths identified at box 1340 are sorted based on their respective times of delivery, as determined at box 1350. At box 1370, an optimal path for the delivery of the ordered item from the fulfillment center to the customer is selected. Alternatively, according to some other embodiments of the present disclosure, the optimal path may be defined based on any other relevant factor, including an optimal manner of delivery, a lower cost or any other qualitative or quantitative measure associated with the delivery of items.

At box 1380, instructions for delivering the ordered item from the fulfillment center to the customer are provided, and the process ends. For example, a control system may provide such instructions to one or more human operators, or to one or more computer-based machines or control systems associated with mover systems, diversion systems or any other components of a network delivery system for causing the ordered item to be transported from the fulfillment center to the customer by way of one or more such mover systems. Such instructions may automatically cause a belted conveying system to transport an item from one point or node to another point or node, or, alternatively, may be provided to a human operator of a hyperloop conveying system or maglev rail conveying system carrying the ordered item (e.g., on a computer display or in another format) for the purpose of causing the ordered item to be delivered between such points or nodes. Moreover, such instructions may automatically cause one or more diversion systems to transfer the ordered item from one mover system to another, or to an extension associated with a destination defined by the customer. The instructions may define any number of operational characteristics regarding the operation of such systems, including a time of departure or arrival for the ordered item, a speed at which the ordered item should travel on a mover system, or a time at which a diversion system may be triggered to transfer the ordered item from one mover system to another mover system.

Accordingly, the systems and methods of the present disclosure may be configured to identify a plurality of paths for transporting an object, such as an item ordered from an electronic marketplace, from an origin to a destination along a network delivery system. An optimal path may be determined based on any factor, including but not limited to a time or a cost of delivery. Instructions for transporting the object from the origin to the destination by way of the network delivery system may be provided by way of a control system to one or more mover systems and/or diversion systems.

Figure 14A:
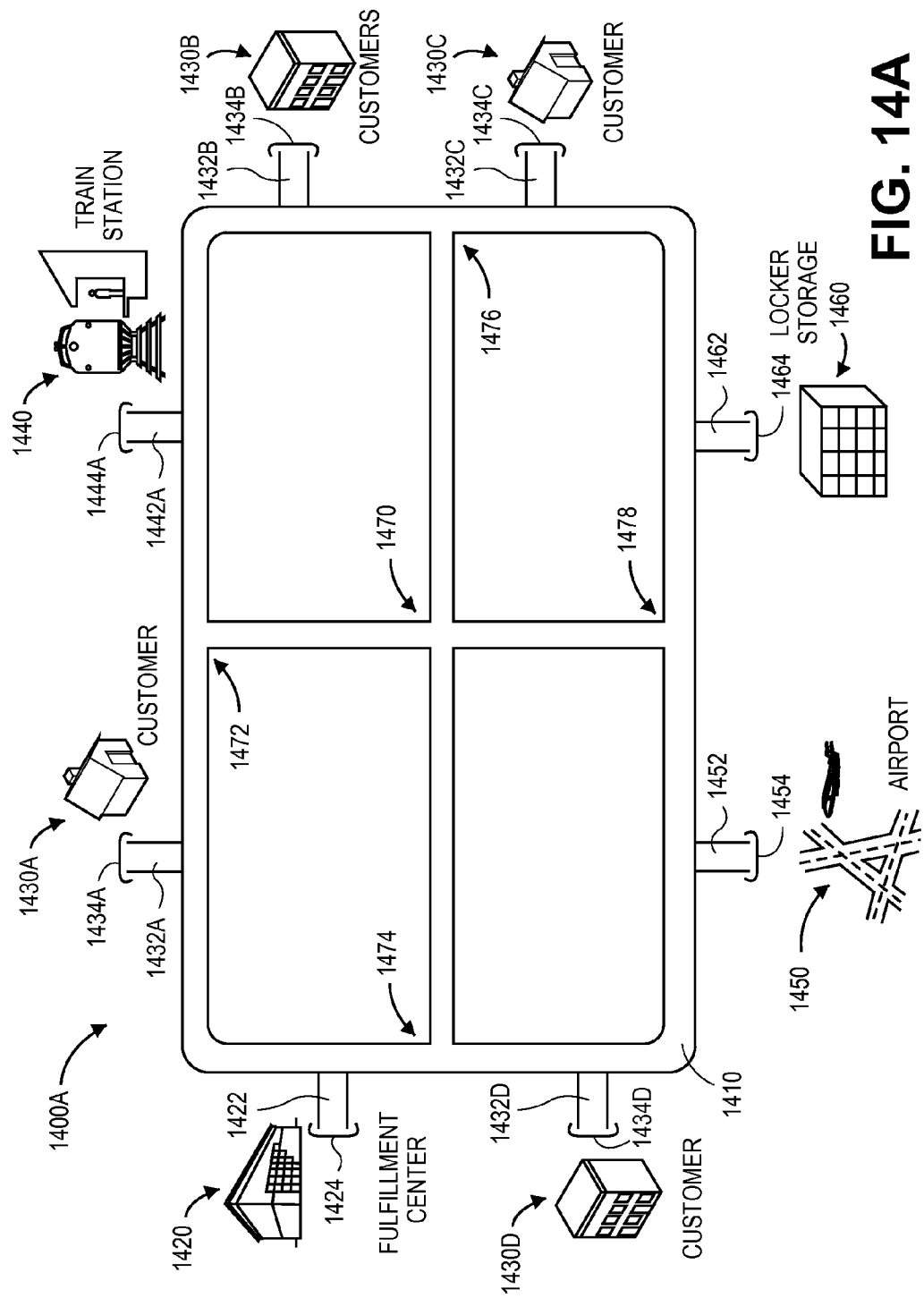
FIG. 14A is a pictorial diagram of a dedicated network delivery system having a plurality of paths extending between a plurality of nodes of a dedicated network delivery system in accordance with the present disclosure.
Figure 14B:
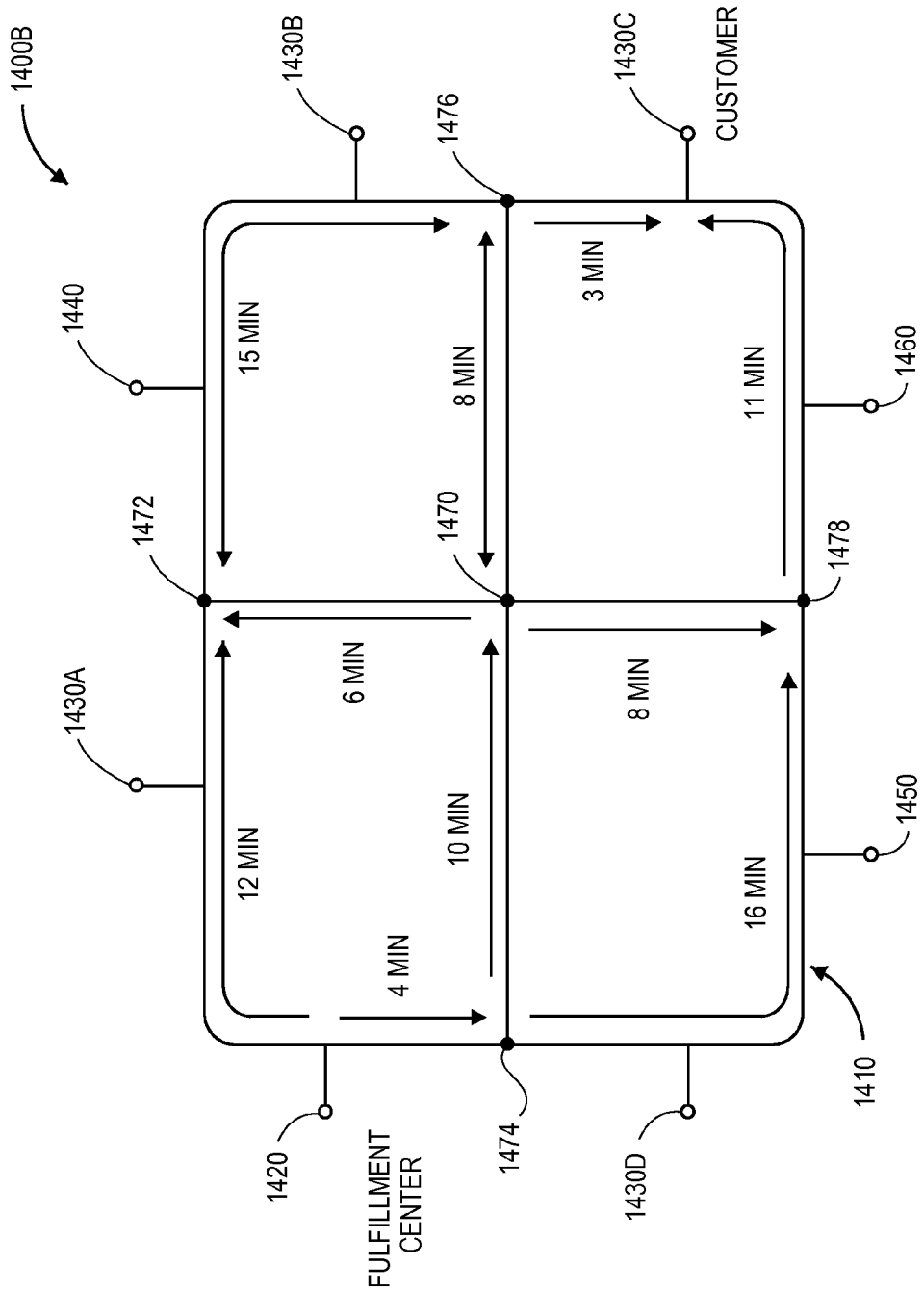

The process of determining an optimal path for transporting an item from an origin to a destination by way of an optimal path in accordance with the present disclosure may be shown with regard to FIGS. 14A, 14B and 14C. Referring to FIG. 14, components of one dedicated network delivery system 1400A in accordance with the present disclosure are shown. Except where otherwise noted, reference numerals preceded by the number "14" in FIG. 14A, FIG. 14B or FIG. 14C indicate components or features that are similar to components or features having reference numerals preceded by the number "3" in FIG. 3.

As is shown in FIG. 14A, the system 1400A includes a main conveyor 1410 extending between locations corresponding to a fulfillment center 1420, customers 1430A, 1430B, 1430C, a train station 1440, an airport 1450 and a locker storage facility 1460. As is shown in FIG. 14, the main conveyor 1410 further includes paths extending between intersection points 1470, 1472, 1474, 1476, 1478.

As is discussed above, the systems and methods of the present disclosure may be used to identify an object to be transported from an origin to a destination via a network delivery system, to determine an optimal path for transporting the object from the origin to the destination through the network delivery system, and to transport the object by way of the optimal path. As is further discussed above, the network delivery system may be represented as a network having one or more segments, and a number of paths extending between the origin and the destination across such segments may be identified. The optimal path may be defined by a control system based on an analysis of the costs or constraints associated with travel along each of the corresponding segments of each of the paths extending between the origin and the destination, and instructions for transporting the object from the origin to the destination along the optimal path may be provided to various mover systems, diversion systems or other related components of the network delivery system.

Referring to FIG. 14B, a schematic diagram 1400B depicting illustrative optimal delivery paths determined within the system 1400A shown in FIG. 14A is shown. The diagram 1400B includes a plurality of points 1420, 1430A, 1430B, 1430C, 1440, 1450, 1460, 1470, 1472, 1474, 1476, 1478 corresponding to the fulfillment center 1420, the customers 1430A, 1430B, 1430C, the train station 1440, the airport 1450 and the locker storage facility 1460 shown in FIG. 14A. The network 1410 is shown as a partially directed acyclic graph, with some of the segments (e.g., the segment between point 1470 and point 1476) indicating available travel in two directions, and some of the segments (e.g., the segment between point 1474 and point 1470) indicating available travel in a single direction.

The network 1410 also indicates travel times and directions between each of the points 1420, 1430A, 1430B, 1430C, 1440, 1450, 1460, 1470, 1472, 1474, 1476, 1478 in the network 1410. For example, as is shown in FIG. 14B, travel in the network 1410 between the point 1474 and the adjacent point 1470 would take ten minutes, while travel between the point 1474 and the adjacent point 1478 would take sixteen minutes. Such travel times may be calculated using one or more computer processors based on any available information regarding congestion, delays or capacities along such paths or associated with such points or nodes.

Thus, by representing the various features of a network delivery system in the form of a network having segments extending between two or more points or nodes, a variety of paths extending between an origin and a destination through such points or nodes may be determined. In particular, paths between two non-adjacent points may be defined by aligning two or more segments in series. For example, where an object (e.g., an ordered item) is to be transported from the fulfillment center 1420 to the customer 1430C, as is shown in FIG. 14A, five paths may be defined as extending between the point 1420 and the point 1430C in the network 1410 of FIG. 14B, and a travel time on any such path defined between the point 1420 and the point 1430C in the network 1410 may be defined as a sum of the travel times along each of the segments.

A first path (e.g., Path A) begins at the point 1420 associated with the fulfillment center and extends through the point 1472 and the point 1476 before reaching the point 1430C associated with the customer. A second path (e.g., Path B) begins at the point 1420 and extends through the point 1474, the point 1470, the point 1472 and the point 1476 before reaching the point 1430C. A third path (e.g., Path C) begins at the point 1420 and extends through the point 1474, the point 1470 and the point 1476 before reaching the point 1430C. A fourth path (e.g., Path D) begins at the point 1420 and extends through the point 1474, the point 1470 and the point 1478 before reaching the point 1430C. Finally, a fifth path (e.g., Path E) begins at the point 1420 and extends through the point 1474 and the point 1478 before reaching the point 1430C.

According to the systems and methods of the present disclosure, an optimal path for the delivery of an object from an origin to a destination may be defined based on time, cost or on any other relevant factor regarding the delivery. The optimal path may be determined by topologically sorting information regarding each of the available paths (e.g., times or costs of delivery along such paths) and selecting one of the paths based on the topologically sorted information. Referring to FIG. 14C, a schematic diagram 1400C depicting information regarding illustrative optimal delivery paths determined within the system 1400A shown in FIG. 14A is shown. The diagram 1400B includes timelines associated with the paths extending between the fulfillment center 1420 and the customer 1430C within the system 1400A of FIG. 14A.

The diagram 1400C indicates the aggregate travel time along each of the five paths extending between the fulfillment center 1420 and the customer 1430C of FIG. 14A, as represented in the network 1410 of FIG. 14B. For example, a travel time of thirty (30) minutes is defined for Path A by adding the times associated with travel between point 1420 and point 1472 (viz., twelve minutes), between point 1472 and point 1476 (viz., fifteen minutes), and between point 1476 and point 1430C (viz., three minutes). Similarly, as is shown in FIG. 14C, travel times of thirty-eight (38) minutes, twenty-five (25) minutes, thirty-three (33) minutes and thirty-one (31) minutes are defined for Path B, Path C, Path D and Path E, respectively. Although the travel times shown for Path A, Path B, Path C, Path D and Path E of FIG. 14C are defined by aggregating the travel times of the segments of such paths as shown in the network 1410 of FIG. 14B, such travel times may further include any additional factor taking into account congestion at each of the points or nodes within such paths, any traditionally observed errors or variances in the estimated travel times shown in FIG. 14B, or any other relevant factors.

Once the travel times of each of the paths extending between the fulfillment center 1420 and the customer 1430C of FIG. 14A are determined, a control system may select an optimal path for the delivery of an object from the fulfillment center 1420 to the customer 1430C based on such travel times or on any other intrinsic or extrinsic information. Accordingly, as is shown in FIG. 14C, the shortest travel time between the fulfillment center 1420 and the customer 1430C is associated with Path C, which may be determined to be the optimal path for the delivery of an object from the fulfillment center 1420 to the customer 1430C on this basis. Once an optimal path is identified, the control system may provide instructions for transporting the object from the fulfillment center 1420 to the customer 1430C to one or more mover systems or diversion systems associated with the dedicated network delivery system 1400A of FIG. 14A, and the object may be automatically delivered along Path C accordingly.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments described herein or shown in the accompanying figures refer to the use of belted conveying systems, the systems and methods disclosed herein are not so limited, and may be utilized along with any type of mover system, including but not limited to belted conveying systems or other forms of conveying systems, as well as static rail or moving rail systems of any kind, rack-and-pinion systems, hyperloop systems or water-based networks in which sealed carriers having one or more items therein may travel within pipes or conduits that are substantially filled with water.

Those skilled in the pertinent arts will recognize that the systems and methods disclosed herein are not limited to a single form of mover system, e.g., a belted conveyor system, or the various combinations of mover systems disclosed herein, e.g., the combined multi-modal dedicated network delivery systems shown in FIGS. 9 and 10. Rather, any form of mover system may be provided in accordance with the present disclosure for the purpose of transporting one or more objects within one of the dedicated network delivery systems disclosed herein. Moreover, those skilled in the pertinent arts will also recognize that the objects transported by the dedicated network delivery systems of the present disclosure may include items of any shape or kind that may, but need not be, provided in one or more containers. Furthermore, although some of the systems or methods disclosed herein are directed to the identification of optimal paths for the delivery of an object from a first point to a second point based on factors such as time of delivery or cost of delivery, the systems and methods disclosed herein are not so limited, and an optimal path may be identified on any basis, including any of the qualitative or quantitative factors disclosed herein, or on any other relevant factors associated with the delivery of the object.

Although some of the embodiments described herein describe specific systems or methods for transporting objects, or for controlling or changing the velocity of such objects in transit, the systems and methods of the present disclosure are not so limited, and may be used with any process or method for conveying any form or type of object. Additionally, such process or methods may be used in series or in parallel, and independently or in conjunction with one another, in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 12 or 13, the orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale, particularly regarding the relative locations of aspects or elements of the network delivery systems disclosed herein to one another in vertical and/or horizontal space.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount. As another example, in certain embodiments, the terms "nearly vertical" or "nearly horizontal" may refer to a value, amount, or characteristic that departs from exactly vertical or exactly horizontal by not more than 15°, 10°, 5°, 3°, 1°, 0.1° or otherwise.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
    a hub associated with a fulfillment center;
    at least one node associated with a customer;
    a plurality of subterranean conveyors configured to transport at least one item, wherein a first conveyor extends along a first axis at least in part between the hub and a first junction, wherein a second conveyor extends along a second axis at least in part between the first junction and the at least one node;
    a first diverter at the first junction, wherein the first diverter is aligned to transfer items from a surface of the first conveyor to a surface of the second conveyor or from the surface of the second conveyor to the surface of the first conveyor; and
    a control system comprising at least one computer device, the control system configured to at least:
        receive information regarding an order for the at least one item from the customer over a communications network;
        determine that the at least one item is available at the fulfillment center; and
        upon determining that the at least one item is available at the fulfillment center,
            cause the at least one item to be placed onto the surface of the first conveyor at the hub;
            cause the at least one item to be transported from the hub to the first junction via at least the first conveyor;
            cause the at least one item to be transferred from the surface of the first conveyor to the surface of the second conveyor by the first diverter at the first junction; and
            cause the at least one item to be transported from the first junction to the at least one node via at least the second conveyor.

2. The system of claim 1, wherein the control system is further configured to at least:
    identify information regarding a plurality of paths extending between the hub and the at least one node;
    select an optimal path of the plurality of paths for transporting the at least one item from the hub to the at least one node based at least in part on the information, wherein the optimal path includes the first conveyor, the first junction and the second conveyor; and
    cause the at least one item to be transported from the hub to the at least one node by way of the first conveyor, the first junction and the second conveyor along the optimal path.

3. The system of claim 2, wherein the information regarding the plurality of paths comprises at least one of:
predicted travel times associated with each of the paths; or
predicted travel costs associated with each of the paths.

4. The system of claim 1,
wherein at least a portion of the first conveyor is provided at a first vertical elevation,
wherein the second conveyor is provided at a second vertical elevation,
wherein the first diverter comprises a conveying elevator provided between the first conveyor and the second conveyor, and
wherein the conveying elevator is configured to transfer the at least one item from the first conveyor at the first vertical elevation to the second conveyor at the second vertical elevation.

5. A system comprising:
at least one powered mover system comprising a plurality of segments and at least one diversion system, wherein at least one of the plurality of segments extends between a first station and a second station, wherein the at least one diversion system is configured to transfer objects between at least two of the plurality of segments, and wherein the at least one of the plurality of segments is subterranean; and
a control system comprising at least one computer device, the control system in communication with the at least one powered mover system,
wherein the at least one powered mover system is configured to transport an object from the first station to the second station on the at least one of the plurality of segments, and
wherein the control system is configured to at least:
receive information regarding a request for the object from a customer over a network;
select an origin of the object based at least in part on the request, wherein the first station is associated with the origin;
identify a destination for the object designated by the customer based at least in part on the request, wherein the second station is associated with the destination;
cause the object to be placed onto a surface of a first segment at the first station; and
provide at least one instruction to the at least one powered mover system, wherein the at least one instruction causes the at least one powered mover system to at least:
transport the object from the first station to at least one junction on the surface of the first segment;
transfer, by the at least one diversion system, the object from the surface of the first segment to a surface of a second segment; and
transport the object from the at least one junction to the second station on the surface of the second segment.

6. The system of claim 5, wherein the first segment comprises a conveyor system having at least one conveyor belt, and
wherein the object is caused to be placed onto a surface of the at least one conveyor belt at the first station; and
wherein the object is transported from the first station to the at least one junction on the surface of the at least one conveyor belt.

7. The system of claim 6, wherein the second segment comprises a rail system having at least one powered rail car,
wherein the object is transferred from the surface of the at least one conveyor belt to a surface of the at least one powered rail car at the at least one junction by the at least one diversion system, and
wherein the object is transported from the at least one junction to the second station on the surface of the at least one powered rail car.

8. The system of claim 5, further comprising:
at least one extension associated with the second station,
wherein the at least one instruction further causes the at least one powered mover system to at least:
transfer, by the at least one diversion system, the object from the surface of the second segment to the at least one extension.

9. The system of claim 5, wherein the at least one of the plurality of segments is configured to transport the object in at least two directions.

10. The system of claim 5, wherein the plurality of segments define at least one loop extending between the first station and the second station.

11. The system of claim 10, wherein the plurality of segments define two concentric loops extending between the first station and the second station.

12. The system of claim 5, wherein the at least one diversion system comprises a conveying elevator configured to transfer the object from the surface of the first segment at a first depth to the surface of the second segment at a second depth.

13. The system of claim 5,
wherein the first station is associated with a fulfillment center, and
wherein the second station is associated with one of a single-family dwelling, an apartment building, an office building, a locker storage facility, a rail station or an airport.

14. The system of claim 5,
wherein the first station is associated with a merchant, and
wherein the second station is associated with a customer.

15. The system of claim 5, wherein the control system is further configured to at least:
identify a plurality of origins of the object, wherein each of the origins is associated with a fulfillment center having access to the object, and wherein the selected origin of the object is one of the plurality of origins for the object; and
predict, for each of the plurality of origins, a level of traffic congestion between each of the plurality of origins and the destination for the object designated by the customer,
wherein the selected origin of the object is selected based on a lowest level of traffic congestion between the selected origin and the destination for the object designated by the customer.

16. The system of claim 6, wherein the at least one conveyor belt comprises a holding extension thereon.

* * * * *